United States Patent

Holton et al.

[11] Patent Number: 6,125,697
[45] Date of Patent: Oct. 3, 2000

[54] APPARATUS AND METHOD FOR MEASURING THE QUANTITY OF LIQUID IN A LIQUID RESERVOIR

[76] Inventors: Bradley R. Holton, P.O. Box 176; Gaylen E. Smith, P.O. Box 404, both of Greenleaf, Id. 83626

[21] Appl. No.: 09/273,160

[22] Filed: Mar. 19, 1999

Related U.S. Application Data

[60] Provisional application No. 60/078,864, Mar. 20, 1998.

[51] Int. Cl.[7] ............................... G01F 23/30; G01B 7/14
[52] U.S. Cl. ........................ 73/309; 73/314; 324/207.14
[58] Field of Search .............................. 73/305, 306, 307, 73/308, 309, 313, 314, 296, 322.5; 327/207.15, 207.16, 207.17

[56] References Cited

U.S. PATENT DOCUMENTS

| | | | |
|---|---|---|---|
| 3,754,446 | 8/1973 | O'Connor | 73/309 |
| 4,300,388 | 11/1981 | Hansel et al. | 73/49.2 |
| 4,345,467 | 8/1982 | Carlson | 73/309 |
| 4,497,205 | 2/1985 | Zulauf et al. | 73/308 |
| 4,537,061 | 8/1985 | DeMeyer et al. | 73/290 R |
| 4,852,054 | 7/1989 | Mastandrea | 73/40 |
| 4,945,756 | 8/1990 | Lewis et al. | 73/49.2 |
| 5,132,923 | 7/1992 | Crawford et al. | 364/558 |
| 5,146,784 | 9/1992 | Maresca, Jr. et al. | 73/308 |
| 5,224,379 | 7/1993 | Koebernik et al. | 73/308 |

*Primary Examiner*—Harshad Patel
*Attorney, Agent, or Firm*—Craig M. Korfanta

[57] ABSTRACT

An autonomous apparatus for measuring the amount in volume, weight or level of a liquid in a tank. The invention provides an easy to read digital numerical display in what ever units the user has calibrated it for, indicating the amount of fluid in the tank. The self-contained electronic devise is normally mounted to a pipe nipple on the top of an above ground storage tank. An attached displacement device extends down through the pipe nipple into the liquid to sense the level of the liquid. This device relies on ambient light to power the solar cells and recharge a battery, which provides all the necessary power to operate the device both day and night. The apparatus is designed to be intrinsically safe and totally sealed. As such it operates electrically as a stand alone gauge and is intended as a general purpose indicator of tank contents for any tank location.

2 Claims, 24 Drawing Sheets

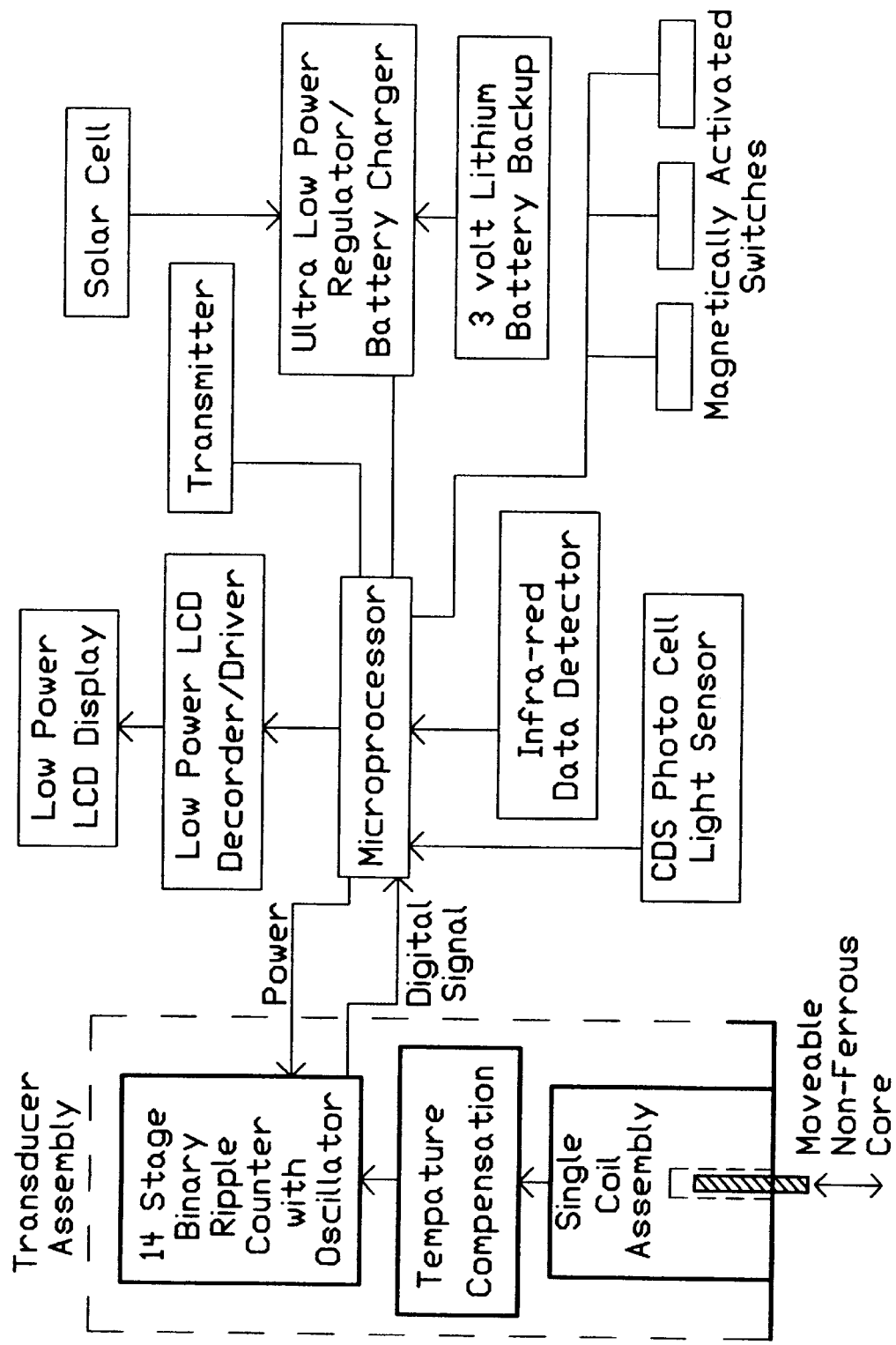

APPARATUS AND METHOD FOR MEASURING THE QUANTITY OF LIQUID IN A LIQUID RESERVOIR

PRIORITY CLAIMS

This application claims the priority of Provisional Patent Application Ser. No. 60/078,864, filed Mar. 20, 1998, which is herein incorporated by reference.

BACKGROUND OF THE INVENTION

1. Technical Field

The present invention relates to stand alone, digital electronic liquid measuring system for use on bulk liquid storage tanks. This general purpose device is designed to be easy to install and calibrate, intrinsically safe around flammable liquids, and is solar powered requiring no on site connections.

2. Background

A number of methods and apparatus for measuring the liquid level in a bulk storage tank exist. Most of the early methods utilized floats and levers in various combinations to move an indicator or pointer or balance beam. Newer electronic methods ranging from simple switches and resistors to more complicated systems of ultrasonic or microwave transducers are also used depending on the specific application. Most of these systems are not capable of high accuracy and may be difficult to install and maintain. On the other end of the list are monitoring systems that utilize precision load cells and displacement methods that can be calibrated for high accuracy. These are most often used in leak detection systems of underground storage tanks in the petroleum industry such as U.S. Pat. No. 5,132,923 issued to Crawford et al.

The primary problem with all of these systems is that they are either too accurate and expensive for general applications, requiring special adaptation to each installation, or they are not accurate enough, difficult to read and difficult to maintain. In addition there are no digital electronic gages that are solar powered and can operate without external power connections.

Most of the patents that describe measuring a liquid in a tank, by measuring the buoyancy force acting on a displacer, are similar to the one described in U.S. Pat. No. 4,945,756 issued to Lewis et al. These devices all utilize a load cell as the force measuring device in connection with precision Wheatstone Bridge circuitry. This method is very accurate but requires a large amount of electronics to operate the load cell. Load cells can be easily damaged, and tend to be rather expensive.

A different method other than the use of a load cell is disclosed in U.S. Pat. No. 4,300,388 issued to Hansel et al. This requires use of at least two fixed coil windings working in relation to a moveable ferrite core. Another similar patent, U.S. Pat. No. 4,537,061 issued to Demeyer et al., discloses a device that measures liquid level by measuring the buoyancy force acting on a displacer. The weight of the displacer is measured by the movement of a ferrite core attached to the displacer that is supported by a spring. The spring offsets the weight of the displacer and allows the ferrite core to move in or out of the variable transformer. This method differs from the present invention in two important respects. The variable transformer must use at least two or more windings and depends upon magnetic coupling of the primary and secondary transformer windings by the ferrite core. The other important difference is that the amplitude of the AC voltage on the secondary transformer is what is measured, not the frequency. This AC output is then converted to a dc signal that is further processed in analog format.

Some of the goals of this invention include: providing a low cost digital indicator that can be calibrated to read volume, level, or weight of a liquid; an indicator which self contained and self powered; and an indicator which is easy to install and set up in a variety of tank sizes and shapes. An additional goal of the invention is to provide a high level indicator to prevent over filling of the tank.

SUMMARY OF THE INVENTION

The present invention provides a low cost general purpose digital tank gage that combines a display unit and a transducer into one package that, when connected to a displacer device, can be independently mounted to a pipe nipple on the top of a tank. The unit is powered by energy collected from ambient light. In one embodiment of the invention a solar cell is mounted inside the back of the display unit to convert a portion of the ambient light to electrical energy. The efficient design allows ambient light to provide all necessary power to operate the transducer and display electronics. It also charges a battery to power the device at night and in low light conditions. As such, this unit is suitable for remote installation in the field as a general purpose indicator of the quantity of fluid in a tank, which is easy to install and setup by non technical personal.

The general principle employed in this invention takes advantage of the Archimedes buoyancy principle which states that a submerged body is buoyed up by a force equal to the weight of the volume of fluid which the body displaces. A displacer rod or sealed hollow tube, having a known cross sectional area along its length, is used to sense the quantity of liquid in the tank. This displacer is suspended freely from a force measuring device by attaching it to a movable nonferrous rod supported by a spring. The other end of this nonferrous rod is allowed to move in and out of a single coil that is part of an oscillator/binary counter circuit. As the nonferrous core moves in and out of the coil in response to a change of weight of the displacer, the frequency of the oscillator/binary counter will change. The output of the digital signal of the counter is then directly passed into a microprocessor for conversion to digital numbers where they can be displayed in any units that may be desired.

The transducer and displacer device are flexibly connected to a moving nonferrous member that extends inside the body of the transducer. This transducer tracks the liquid level by measuring the buoyancy force that the liquid has on the displacer. The weight of the displacer is counter balanced by a spring that is contained inside the transducer body. As the force acting on the displacer changes, both the buoyancy force and the spring cause a change of position of a nonferrous element attached to the displacer causing the upper end of the nonferrous element to move inside a single coil assembly. In this way a change of liquid level inside the tank will result in a change of the position of the movable nonferrous element inside the coil. This change in position is measured by the effect it has on the inductance of the coil and thus changes the frequency of an oscillator circuit attached to the coil assembly. The oscillator signal is further divided by a counter to a low frequency and communicated from the transducer as a digital signal directly to a microprocessor associated with the display board. The microprocessor and a set program of operations are then used to convert the digital signal into a useful output to be read by the operator. The output is displayed on a display such as a four digit LCD display. Other types of indicators may be used as desired such as an alpha numeric display, depending upon the specific application of the apparatus.

The housing of the display unit may be sealed from any outside access which allows it to be used in hazardous environments and outside locations. One embodiment the invention has no switches or connectors available anywhere on the outside of the housing. In this embodiment, programming and calibration access to the unit are accomplished by magnetically activating switches from the front display panel or by directing digitally encoded pulsed infrared light onto an infrared detector also mounted in the front display panel. From either one of these inputs, the unit can be adjusted to zero the display, or to increment or decrement the units to correspond to a known quantity of liquid that is added to the tank after the zero point was found when the tank was considered empty.

Further features and advantages of the invention will be set forth in part in the description that follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

The invention is herein described, somewhat schematically and by way of example only, with reference to the accompanying drawings illustrating one form of apparatus constructed in accordance with the present invention.

FIG. 10 is a block flow diagram of another embodiment of the device;

DETAILED DESCRIPTION OF THE INVENTION

Figure 1:
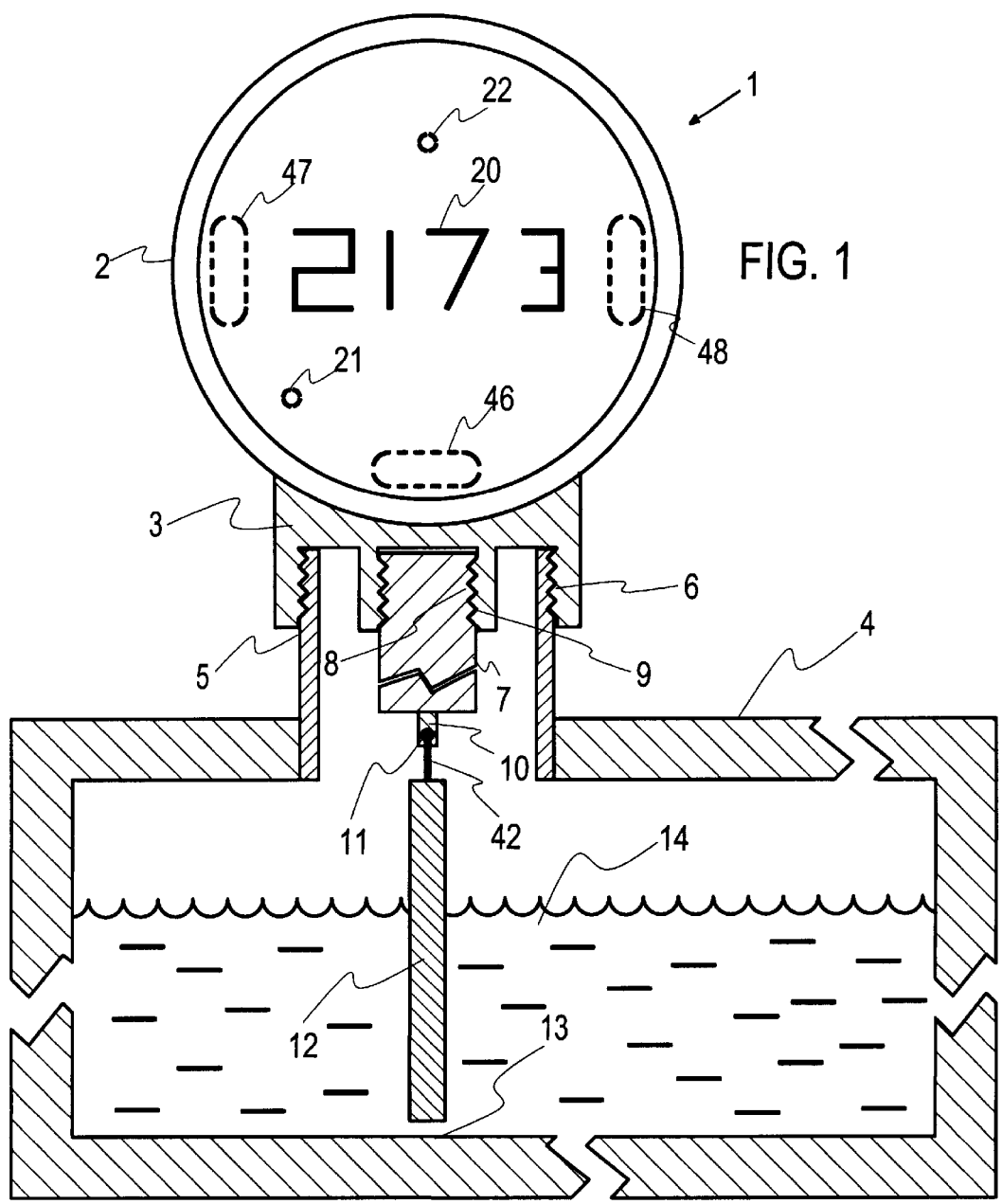
FIG. 1 is a front view of a gauge, partially in section, with ghost outlines of hidden switches, mounted to a tank also shown in section.

Referring now to FIG. 1 there is shown, illustrated from a forward facing orientation, a partially exposed view of a sealed housing of an autonomous apparatus 1, for measuring the quantity, volume, weight or level 14 of a liquid in a tank 4, according to the present invention. The rectangular base portion 3 of the apparatus' housing is joined to the tank by a threaded nipple 5 which is engaged in threaded bore 6 inside rectangular base 3. Rectangular base 3 depends downwardly from a horizontal cylindrical portion 2 of the housing.

A transducer 7 here has a cylindrical housing and having threads provided on its outside upper end 8 which are engaged with threaded bore 9 in base 3, thereby making a seal with rectangular base 3 of the sealed housing. A conductive path between the threads of threaded bore 6 and the threads of the threaded bore 9 is provided to eliminate voltage potentials developing between the housing of transducer 7 and the tank nipple 5. A moveable nonferrous cylindrical rod 10, hereafter referred to as a rod 10, is attached within the downward end of the transducer housing and protrudes downwardly from within and beyond the bottom end of the transducer cylindrical housing. Rod 10 is attached by a flexible member 42 between hole 11 and displacer 12 and is free to move a distance up and down. This flexible member will be described later on in more detail.

The lower end of displacer 12 should remain clear of the inside bottom 13 of tank 4, or any other structure within the tank during normal operation of the apparatus. Changes in position of displacer 12 as the liquid level 14 changes in the tank 3 result in upward or downward changes in the position of rod 10 and thereby give input to the apparatus to determine the amount of a liquid in a tank. The illustrated embodiment of the invention relies on the transducer being vertically disposed and aligned with nipple 5 at the top of the tank. In other embodiments the transducer may be disposed in other angles or locations other than a pipe nipple at the top of the tank by the use of such items as pulleys, cable attachments, guide tubes or similar flexible connectors.

Figure 2:
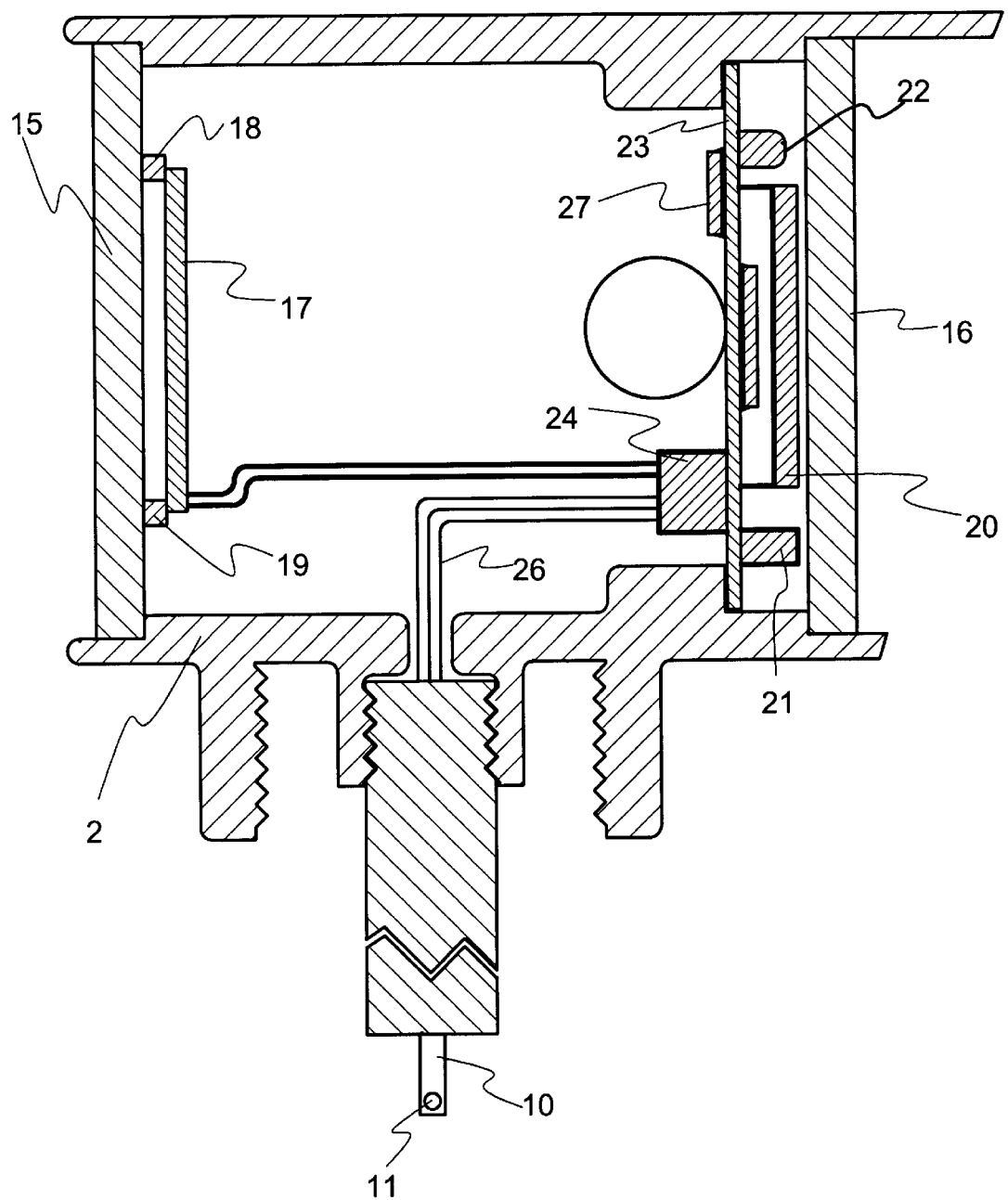
FIG. 2 is a side section view of the gauge housing with a transducer attached.

Referring particularly to FIG. 2, the apparatus is shown in a detailed partial section view from the side. Housing 2 in this embodiment is an injected molded piece utilizing a material such as Delrin, made by the 3M Company, but housings of various materials and designs may be used to contain the workings of this apparatus and stay within the scope of this invention. Housing 2 is here formed as a one piece construction including a horizontal cylindrical portion to receive to two flat circular disks 15, and 16. Disk 15 is positioned at the back end and disk 16 is positioned at the front end of the cylindrical portion of housing 2. These disks are here made of clear transparent material such as acrylic. The inside side of disks 15 and 16 are masked off and a material is applied such as paint, to facilitate printing and display of product information, and allow viewable areas of the inside. Each disk is advantageously permanently affixed to the housing and sealed to provide a hermetic seal to housing 2.

Solar cell 17 is mounted adjacent and parallel to the inward side of disk 15 on the inside of the apparatus. Solar cell 17 is aligned with a masked off area on the inward side of disk 15 to allow ambient light to pass through a translucent area of the disk which corresponds to the size and shape of solar cell 17. Here, solar cell 17 is placed directly behind and parallel spaced apart from the translucent portion of disk 15. In the this embodiment, two semi-rigid rectangular blocks 18 and 19, such as black closed foam tape, are positioned at vertical opposing ends of solar cell 17 thereby setting and maintaining a set distance of the solar cell from the inward side of disk 15. A flexible adhesive, such as RTV silicone made by the General Electric Company, is used to attach the blocks 18 and 19 to disk 15 as well as solar cell 17. In other embodiments of the apparatus other methods of mounting the solar cell can be used, such as double sided adhesive foam tape or mounting the solar cell directly to a circuit board adjacently spaced back and apart from the inside of disk with the circuit board mounted to the inside of the housing.

Display 20 is mounted on the forward side of the main printed circuit board (PCB) 23 which is mounted to the inside of the housing adjacently spaced behind disk 16. An area that has been masked off to match the active display area of display 20, such as a liquid crystal display, is left transparent, but in this embodiment the display is not attached to the back side of the disk 16. Additional transparent areas are provided for a photo resistor 21 as well as an infrared data receiver 22 in masked off areas of disk 16. In the illustrated embodiment of the apparatus, magnetically activated switches 46, 47, and 48 are mounted on the forward side of PCB 23 behind the masked off areas of disk 16. These items are further described later on. In another embodiment of the apparatus solar cell 17, photo resistor 21, infrared data receiver 22, display 20, and magnetically activated switches 46, 47, and 48, can all be mounted on the same side of the housing.

Figure 3:
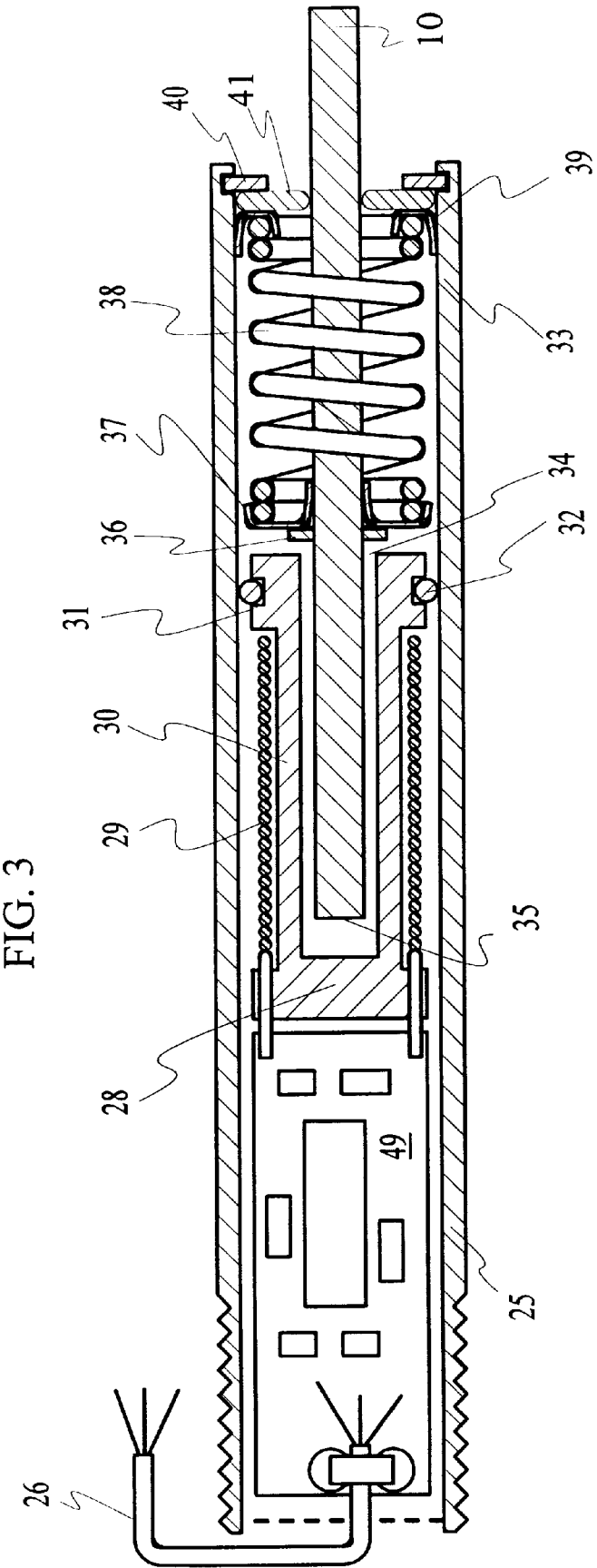
FIG. 3 is a side partial section view of the transducer, showing its major components.

FIG. 3 is a horizontal partial cross-sectional detail view, illustrating in general transducer 7 and the various mechanical components and transducer electronics 49 thereof. The outside of transducer housing is here formed of a nonferrous pipe 25, such as a common half-inch by five inch brass pipe nipple. For the purpose of explanation threads 8, on the end of the pipe where the three conductor wire 26 exits transducer 7, shall constitute the top end of the transducer.

An important part of the transducer is a single coil assembly (coil) 28 which senses the position of rod 10 as rod 10 moves inside coil 28. Coil 28 is formed by winding a single layered wrap of wire 29 such as magnet wire of twenty-eight awg manufactured to NEMA specification MW 28-C, around the outside of a plastic coil bobbin 30 where a landing of 0.4 inches diameter by 1.25 inches long is provided. This results in a coil which has an inductance value of twelve to thirteen Henrys depending on how much of the top end 35 of nonferrous rod 10 is inserted into it. Each end of the single layered wrapped wire 29 terminates in the electronics portion of the transducer, which is here mounted adjacent to one end of coil 28. This electronics portion is explained in detail later on. A groove 31 is formed on the lower outer diameter of plastic bobbin 30 to accommodate an o-ring 32. A hermetic seal is provided by placement of o-ring 32 between the inside wall of pipe nipple 33 and plastic coil bobbin 30. Advantageously, all voids from the o-ring, up to, and including the upper most point of the inside of the pipe nipple, are filled with epoxy. This feature ensures a sealed barrier between the atmosphere of the tank and the inside housing of the apparatus as well as isolating and protecting the coil and transducer electronics 49. A blind end hole 34, such as a 1.30 inch deep by 0.2650 inch diameter hole, is formed inside of the bobbin to slidably receive rod 10. This rod may be of any nonferrous material such as an alloy 360 brass, having an outside diameter of 0.250 inches by 4.0 inches in length. In another embodiment of the apparatus the physical size of the single coil 28 and the associated nonferrous rod 10 may be adjusted in size to achieve a desired response of the transducer in relation to the amount of travel the transducer rod. In the illustrated embodiment of the apparatus, top end 35 of rod 10 is not allowed to travel past 0.125 inches from either end of coil 28. The purpose of this is to utilize the most linear area of response of coil 28 and avoid any edge effect which can occur at either end of the coil winding. Any change in the amount of nonferrous rod inserted inside of the coil will cause a corresponding change in the inductance of the coil. Thus the inductance of coil 28 is inversely proportional to the amount of rod 10 inserted into it. Substitution of a ferrous rod will cause the inductance of the coil to be directly proportional to the amount of rod inserted into the coil.

Figure 4:
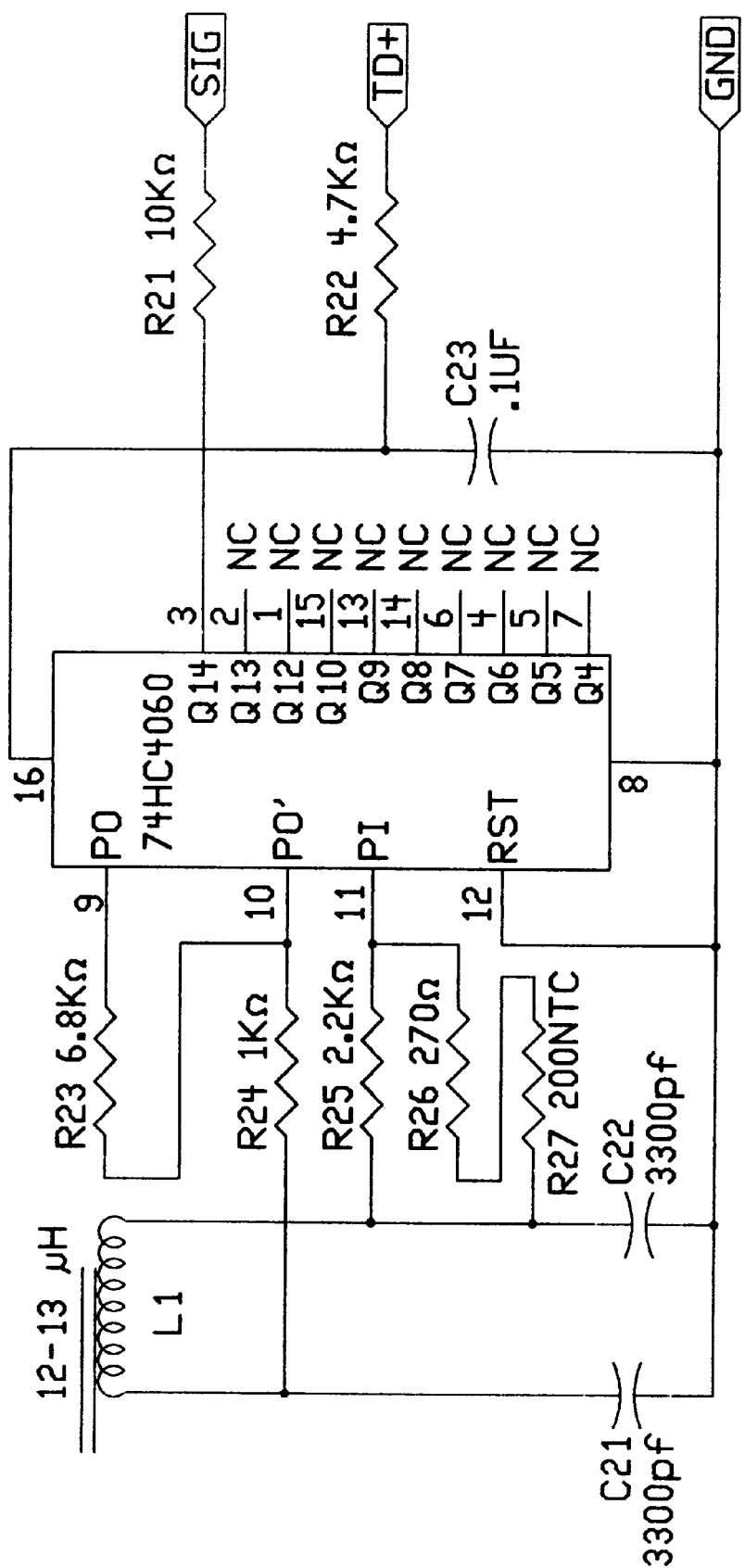
FIG. 4 is a schematic diagram of the transducer circuitry.

Electrically attached to the upper end of coil 28 are the transducer electronics 49. Coil 28 makes up part of an oscillator circuit utilizing a generic 74HC4060 oscillator/ counter integrated (IC) circuit as schematically illustrated in FIG. 4. Two 3300 pF capacitors are used in conjunction with coil 28 to form a resonant circuit. The oscillator input and output connections of the IC are attached to the resonate circuit through a 1 K resistor and a temperature compensating resistor network. This resistor network offsets and reduces errors induced by the effect of changing temperatures on the circuit components of the transducer, and as such the frequency of the oscillator will change in response to any change in the coil inductance. The IC oscillator is internally connected to a fourteen stage binary ripple counter which divides the frequency of the oscillator by 16,384. The output of this counter, which is a digital signal in the frequency range of 60 to 65 hertz, is sent through a 10 K ohm resistor to reduce radio frequency emissions and then on to one conductor of three conductor wire 26. The frequency or period of the digital signal is directly related to the oscillator frequency which is determined by the inductance of coil 28. The output power and ground conductors are also supplied through two remaining conductors of wire 26. The voltage supplied to operate the IC and associated components of the transducer is three volts. The three conductor wire contains a positive lead and connects to a 2 K ohm resistor which is in series to the power supply line of the 74HC4060 IC. The effect of this resistor is to further reduce the operating voltage of the IC to two volts and thus reducing the power supply current to approximately 500 micro-amps. An additional benefit of operating at this low level of power is the apparatus can be classified as intrinsically safe.

Rod 10 has a hole 11 provided on its bottom end and a groove provided 1.25 inches from the top end 35 of rod 10. An "E" style clip 36 is attached to the groove on the rod which, when in contact with the bottom of plastic bobbin 30, acts as the maximum upward/inward travel stop of rod 10. A formed cup washer 37 is placed axially over the rod 10 and the outer cup side being positioned up against the bottom of clip 36. The inner side of the cupped washer centrally contains the upper end of spring 38 in relation to rod 10. The opposite end of spring 38 is held and axially centered in place on the inside of the cupped washer 39. This places spring 38 in compression to resist the force applied by displacer 12. The amount of the force exerted by the displacer on the spring should be balanced by the proper selection of the spring to keep transducer 7 in its best operating range. As this force changes, the position of the rod will change and the upper end of the rod will move in or out of a single fixed coil assembly 28. When the maximum compression of spring 38 has occurred, the rod will be at the outer most position of travel. In this embodiment of the apparatus the best useable range of the transducer is about one half of an inch in the center of its travel. The outer diameter side of the formed cup washer 39 is slightly larger than the inside diameter of pipe nipple 33 and is made of a thin gauge metal thereby allowing the washer to be press fitted in place inside the nipple in the position shown. This provides an electromechanical connection of the washer to the pipe nipple. A conductive path is provided from the cylindrical transducer housing through washer 39, through the spring 38, through the upper formed washer 37, through the "E" style snap ring 36 and through rod 10. At the bottom most end of pipe nipple 23 a groove is cut along the inside wall of the pipe. A common internal snap ring 40 is place into this groove. Nylon washer 41, such as a nylon washer having the a inside diameter hole of 0.270 inches and an outside diameter of 0.497 inches is held in place inside the pipe nipple between washer 39 and internal snap ring 40. Rod 10 translates back and forth through the inside hole of nylon washer 41. Nylon washer 41 provides a low friction surface for rod 10 when it responds to changes in position of displacer 12 and keeps rod axially centered in the transducer. In other embodiments of the apparatus, the physical dimensions of the transducer components may be increased or decreased to achieve different ranges in the resolution of the transducer.

Figure 6:
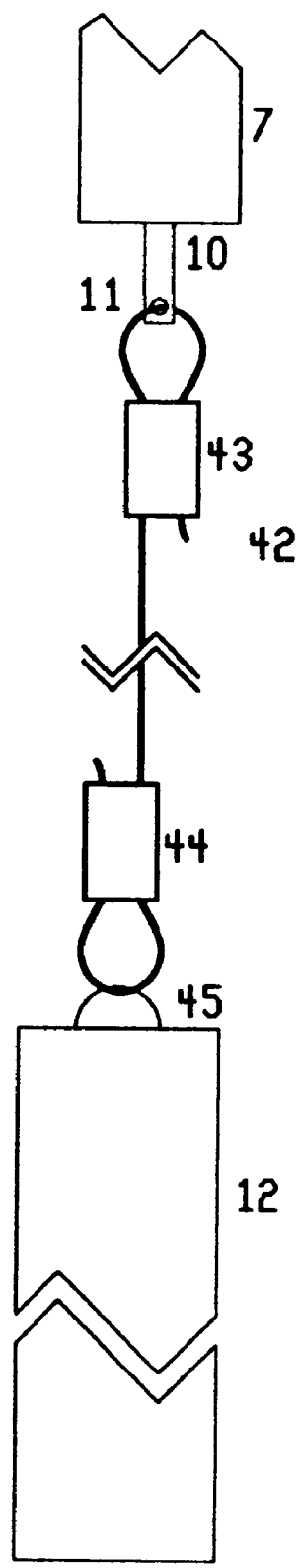
FIG. 6 is a detail view of a flexible cable attachment.

Now referring to FIG. 6, towards the downward end of rod 10 a small radial hole 11 is provided as an attachment point for a flexible cable 42, such as a 0.0625 inch extra fine multi-bradded stainless steel cable, which has a closed loop formed at the top end of the cable through the hole 11 and closed using a common double barrel cable crimp 43. At the bottom end of cable 42 a second closed loop is formed using a second common double barrel cable crimp 44. The second loop of the flexible cable 42 passes through a hole 45 provided in the top end of displacer 12. Displacer 12 is thereby flexibly attached to rod 10 of the transducer, and the movement of such will cause a change in the position of the rod inside of bobbin 30 in response to the liquid level 14 changing inside of tank 3. The overall length of cable 42 determines the location of the displacer rod suspended within the liquid in the tank. In other embodiments the use of a stainless steel chain or other flexible or semi-flexible attachment hardware may be used between displacer and transducer. Furthermore, both the spring constant and the physical size, shape, and material of the displacer may also be changed to achieve a desired resolution of the transducer to match a specific tank as is explained below.

The housing is assembled with the electronics and probe (containing the transducer) prior to shipping, A displacement device must be attached to the end of the transducer. The unit is then installed on a two inch pipe nipple, for example.

Each displacement device is made to fit a certain size tank. In the case of one aboveground storage tank manufacturer's (AST) 1000 gallon tank, the displacement device is thirty-five inches long. This length determines the diameter of the displacement device, which in turn determines the strength of the spring in the transducer. In this case the displacement device is 2.25 pounds in weight, and has an outside diameter of 1.25 inches and the transducer requires a 3 pound spring.

Prior to installation on the tank, the displacement device is attached to the transducer using 0.125 inch aircraft cable. It is then allowed to hang freely, and the display is zeroed. This reflects an empty tank condition. This calibration tank will be filled to capacity. Calibration can be accomplished by using the plus and minus switches to correlate the volume in the tank to the number displayed, which can be in inches, gallons, liters, percent of full, etc. The gauge will then know both the empty and full positions. Pre-calibration can be accomplished using various weights to simulate different tanks and capacities.

The installation of the digital liquid gauge assembly can be easily done in the field and requires no external connections to any power source. One embodiment of the unit has a gauge display and transducer assembly, and a rod or pipe to act as a displacer. The gauge head is designed to screw onto a two inch by six inch pipe nipple that must be provided at the top of the tank. The first step of the installation process is to measure the distance from the bottom of the inside of the tank to the top of the two inch pipe nipple on top of the tank. From this measurement the displacer can be accurately attached to the probe rod, using the cable provided, as described in the following example.

If the inside tank height to the top of the nipple is sixty inches, then the displacer should be cut eight inches shorter or in this case fifty-two inches. Since the pipe nipple will thread into the gauge head by about one inch, and one inch of clearance must be allowed so that the displacer does not touch the bottom of the tank, the proper distance from the top of the displacer to the bottom of the gauge housing with no force load pulling on the probe rod is six inches. The cable attachment must then be adjusted so that this distance is realized. Once the displacer is attached the probe rod, it is then inserted into the two pipe nipple and the gauge head is then screwed onto the pipe. The self contained unit is solar powered and only needs to be calibrated to work properly. The displacer will normally be cut to the proper length for a particular tank before it is shipped to the customer, and only the cable attachment will need to be done in the field.

The calibration of this device is normally accomplished by first setting the zero point of an empty tank, and then filling it with a known quantity of liquid. The display can be adjusted to read in gallons, liters, pounds or any units the user may desire. The setting of these calibration values is accomplished through magnetically activating one of three switches that are located above and on either side of the numerical display window. A combination of one or more switches are used to set the display to zero and should be done when the tank is empty. After filling the tank with a known quantity of liquid, the right and left switches may be activated to increase or decrease the displayed value until the desired value is indicated. The use of magnetic switches eliminates the need for special gas tight switches and keeps the enclosure weather tight. For round tanks or tanks of other shapes, additional information must be entered that will set up the proper correction tables in the microprocessor. For this reason, an infrared data receiver device is also incorporated into the circuitry that allows the calibration to be done optically again without compromising the seal of the gauge unit.

The size and weight of the displacer is determined largely from the height of the tank. The displacer should always have a negative buoyancy meaning that it will never actually float. It's apparent weight however, does change as the liquid rises or falls and it is this change in apparent weight that is measured as more or less of the displacer is submerged in the fluid. The spring in the transducer offsets the weight of the displacer. This spring allows the change in apparent weight to result in a small linear travel of the displacer and probe rod. This change in position of the probe rod is what is measured by the transducer. Advantageously, a spring and displacer combination are selected to limit the spring to 25% to 75% of its working range. This produces a travel of the probe rod of about one-half an inch and provides for maximum signal and minimal temperature errors. The spring constant is generally fixed at the time of manufacturing and cannot be changed in the field. This leaves the displacer as the variable that must be selected for different tank sizes.

For example, the spring that is used here has a range of zero to three pounds of force. The desired operating range of the displacer is from 0.75 pounds when the tank is full to 2.25 pounds when the tank is empty (25% to 75% of three pounds). This allows for a change of weight on the displacer of 1.5 pounds along its working length. If, as in the previous example, the displacer length is fifty-two inches, then from a previously prepared table it can be determined that the optimum diameter of the displacer is 1.10 inches. These table values are determined from the specific gravity of the liquid in the form of pounds/gallon, in this case diesel oil, and finding a cross sectional area that will result in a volume displacement of 1.5 pounds over a distance of fifty-two inches.

Once set up and calibrated the unit will operate day and night and will need no other attention unless the user wishes to fine tune the calibration values. It is not always possible to predict where the true empty point of a tank is because most tanks cannot be completely pumped out and some liquid will always remain. The user may wish to repeat the calibration process to establish a more useful and accurate reading for their particular application.

The wire connections, as shown in FIG. 2, of the transducer are made at wire terminal block 24 on the inside side of PCB 23 as well as solar cell 17 during the assembly of the various components of the apparatus before the transparent ends are sealed to the housing. In one embodiment of the apparatus, multiple transducers are connected to a wire terminal block similar to wire terminal block 24 inside a sealed housing. In yet another embodiment of the apparatus the display housing is independent of the transducer associated with the tank and an intrinsically safe connection is provided between one or more transducers and the display housing, allowing the apparatus to monitor liquid in multiple tanks at different locations. In yet another embodiment, the transducers communicate via radio remote transmitters and the display housing is in communication with a receiver that monitors their signals and displays the tank liquid amounts.

Figure 5A:
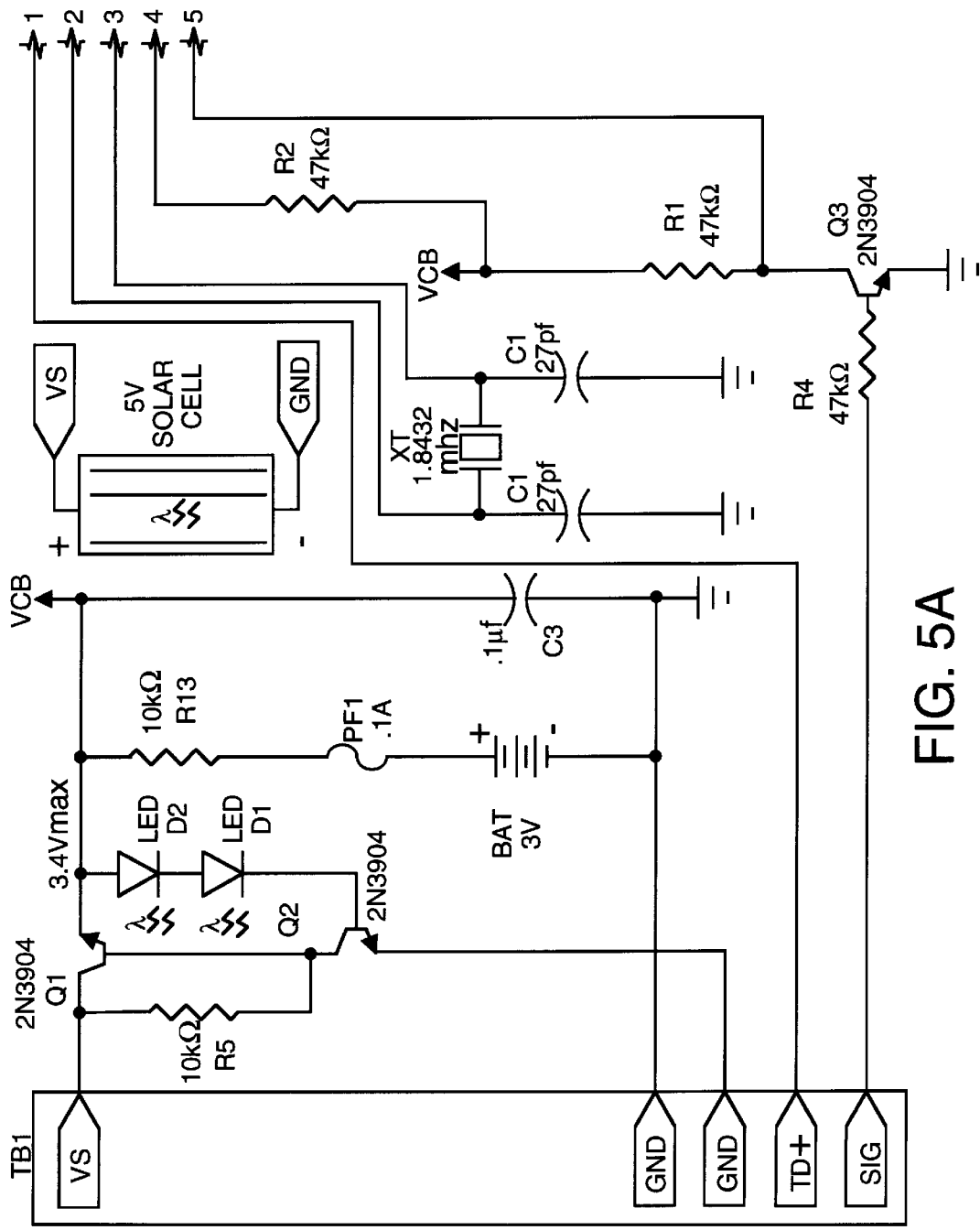
FIGS. 5A through 5C are a schematic diagram of the gauge circuitry.
Figure 5B:
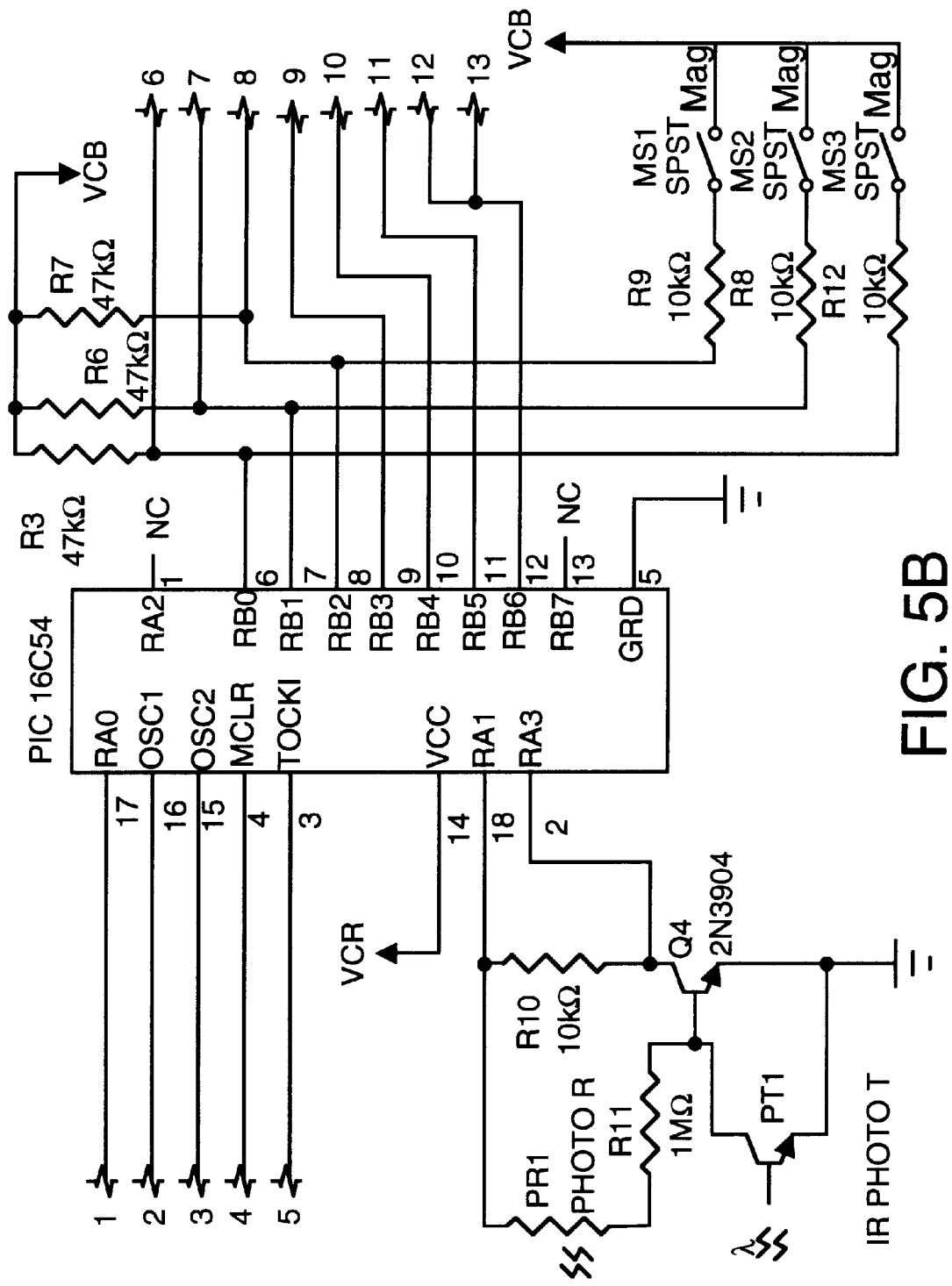
Figure 5C:
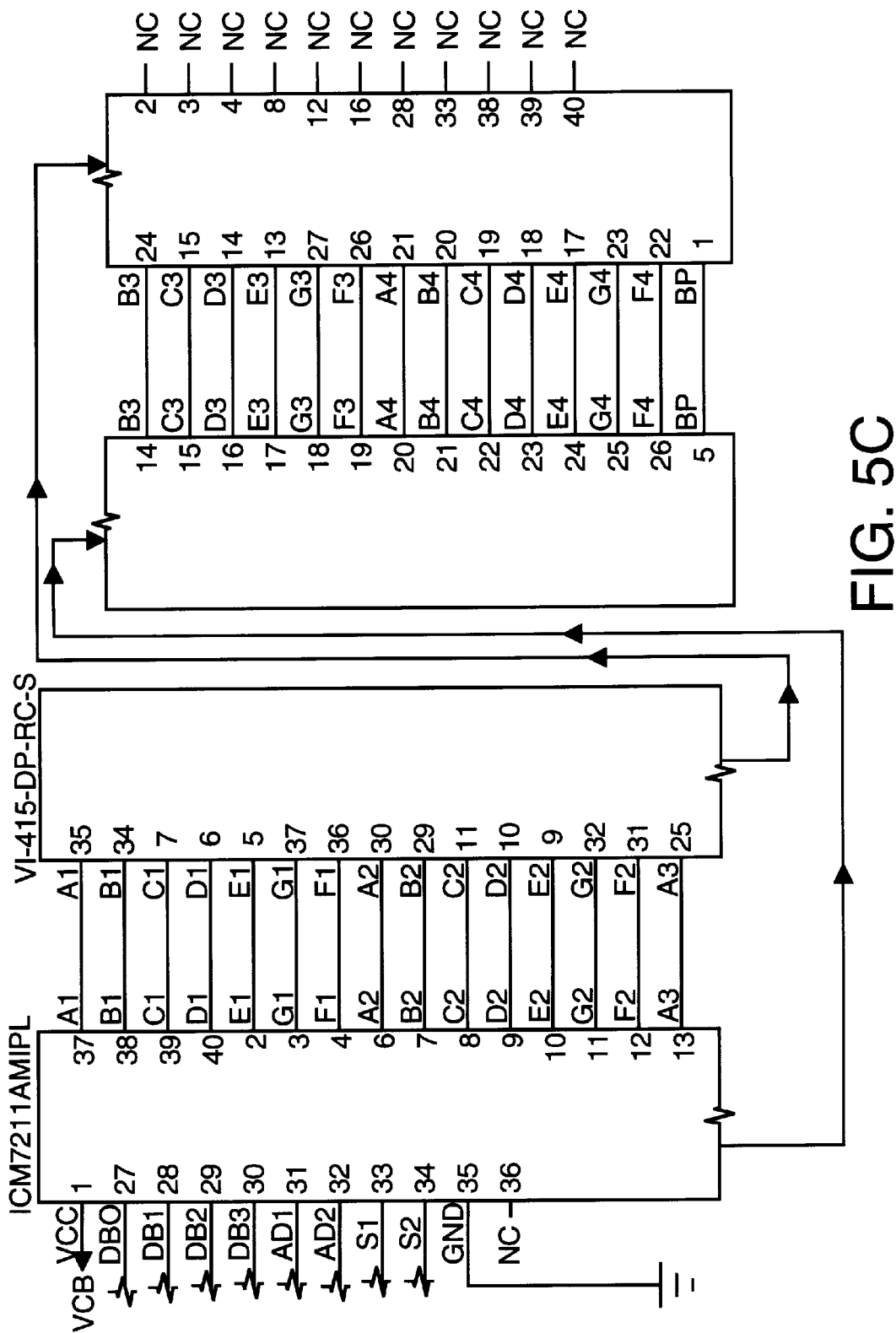
Figure 7:
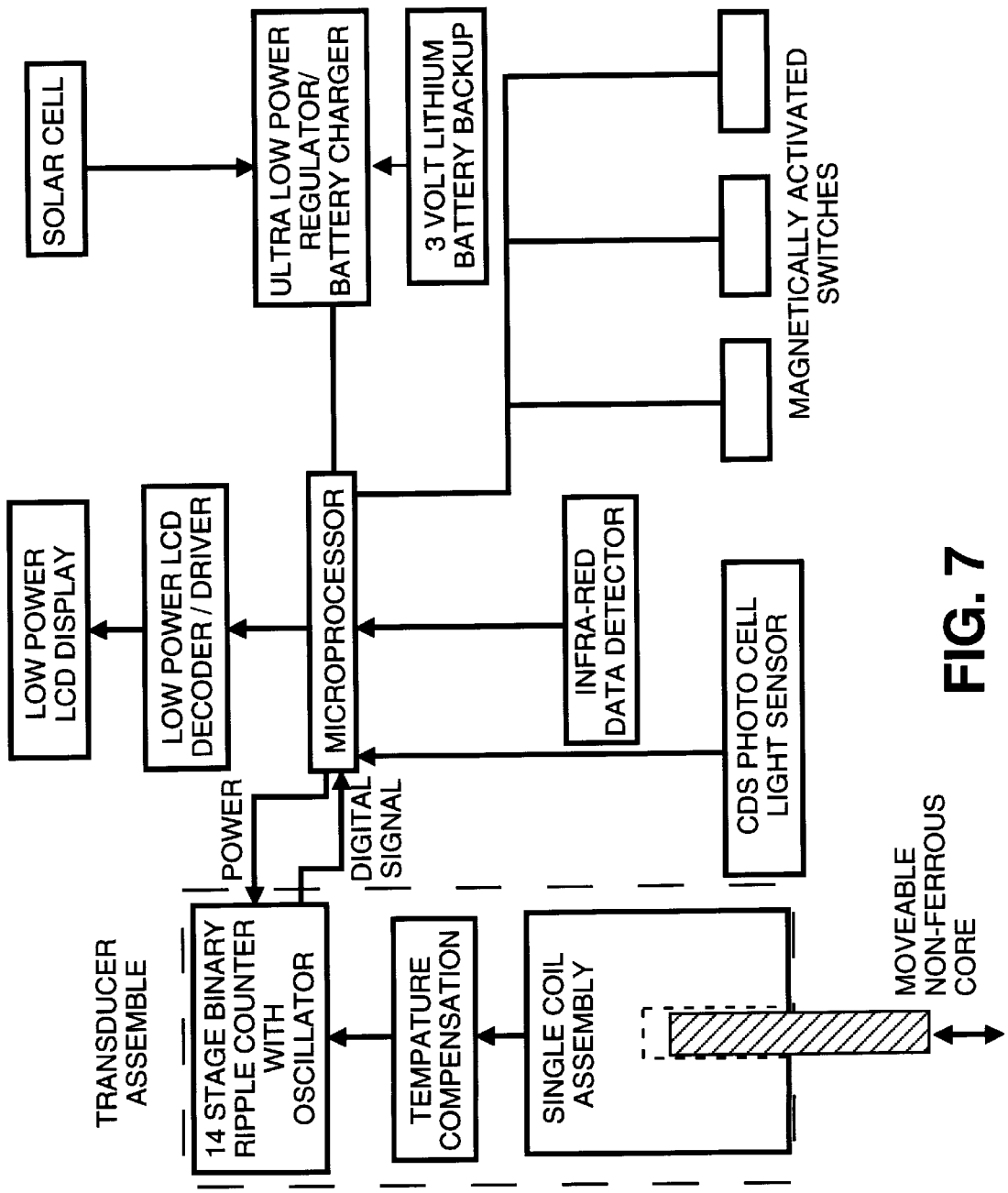
FIG. 7 is a block flow diagram of the device.
Figure 8A:
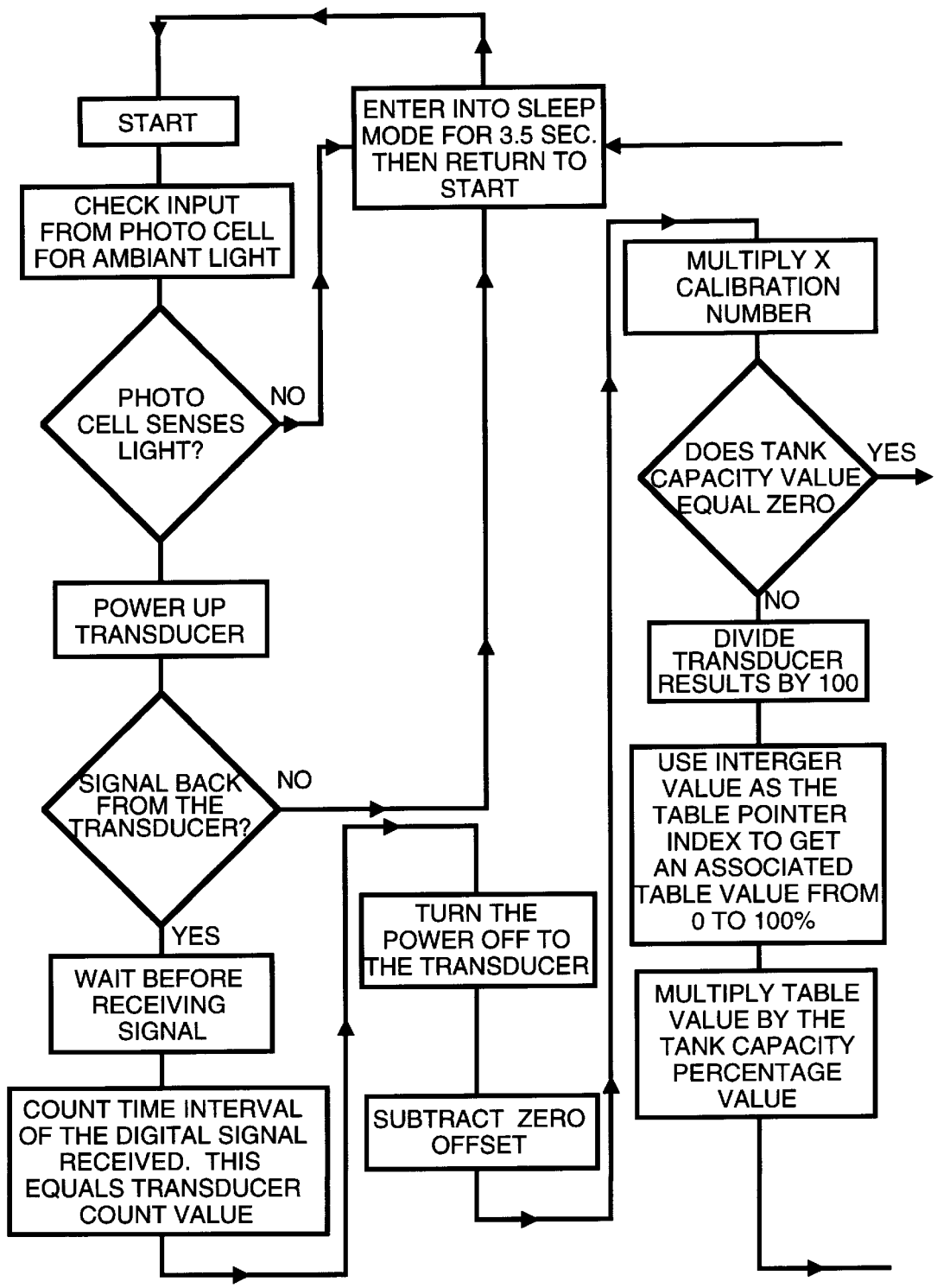
FIGS. 8A and 8B are a block flow diagram of the overall microprocessor program.
Figure 8B:
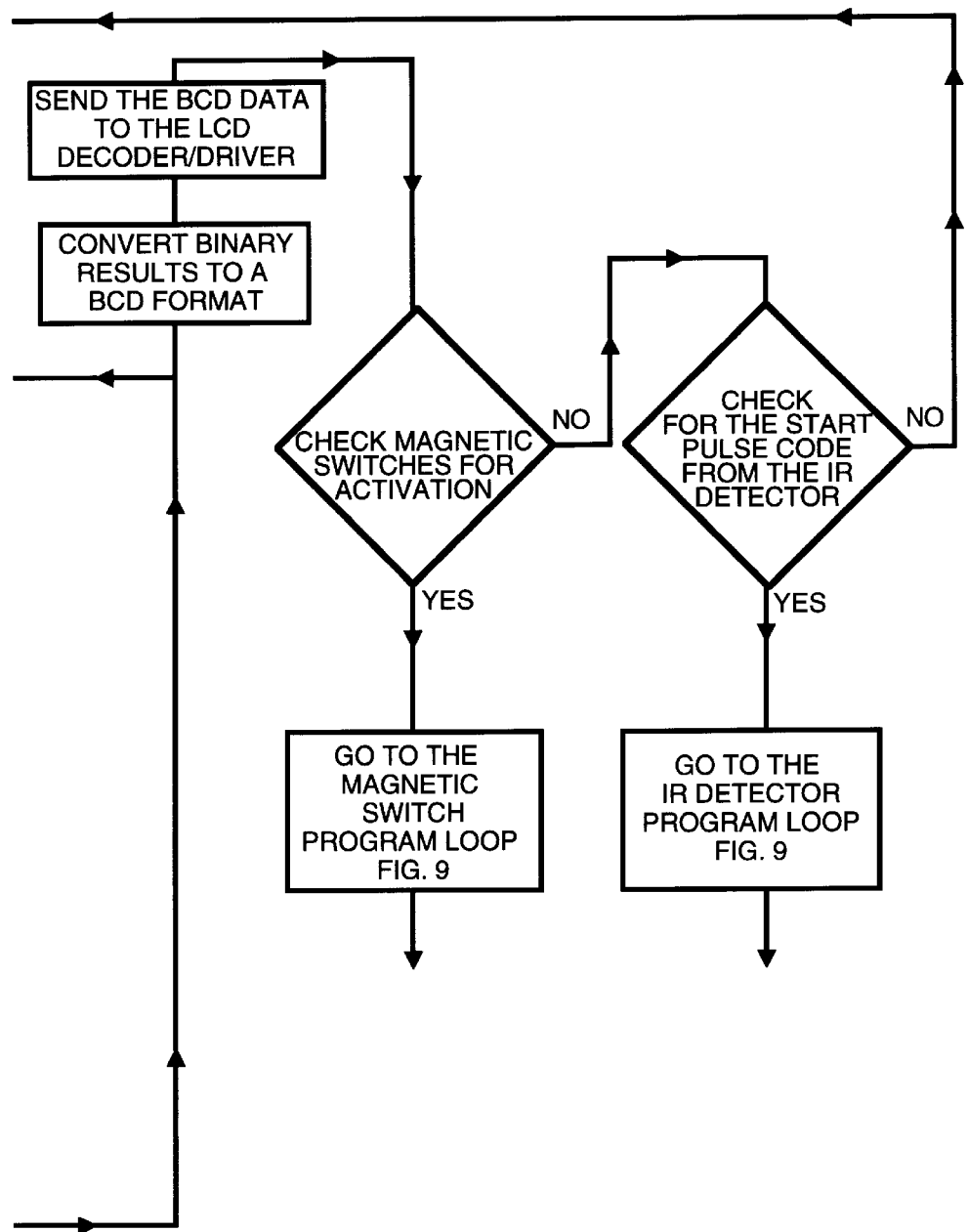
Figure 9A:
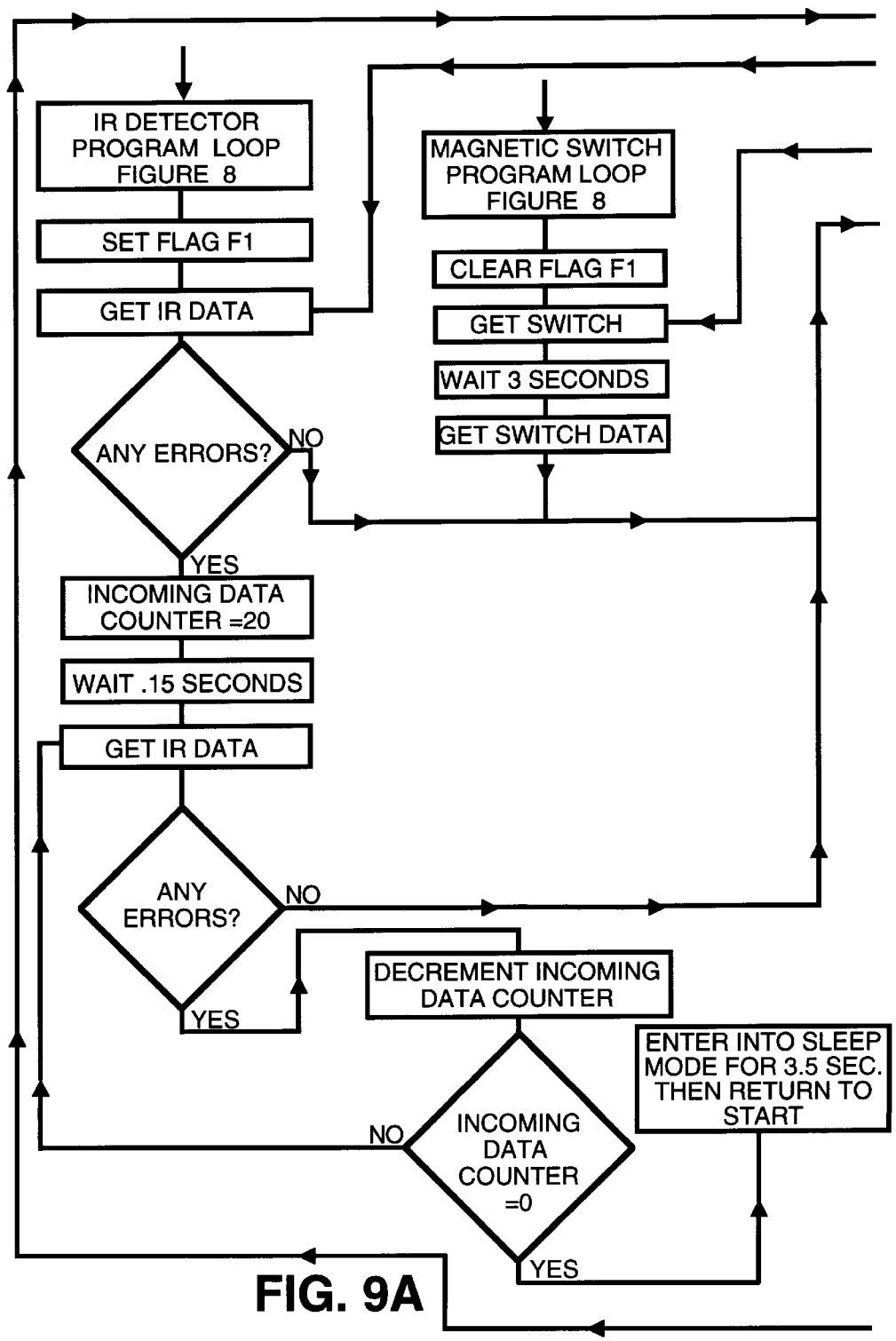
FIGS. 9A through 9C are a block flow diagram of input portion of the microprocessor program.
Figure 9B:
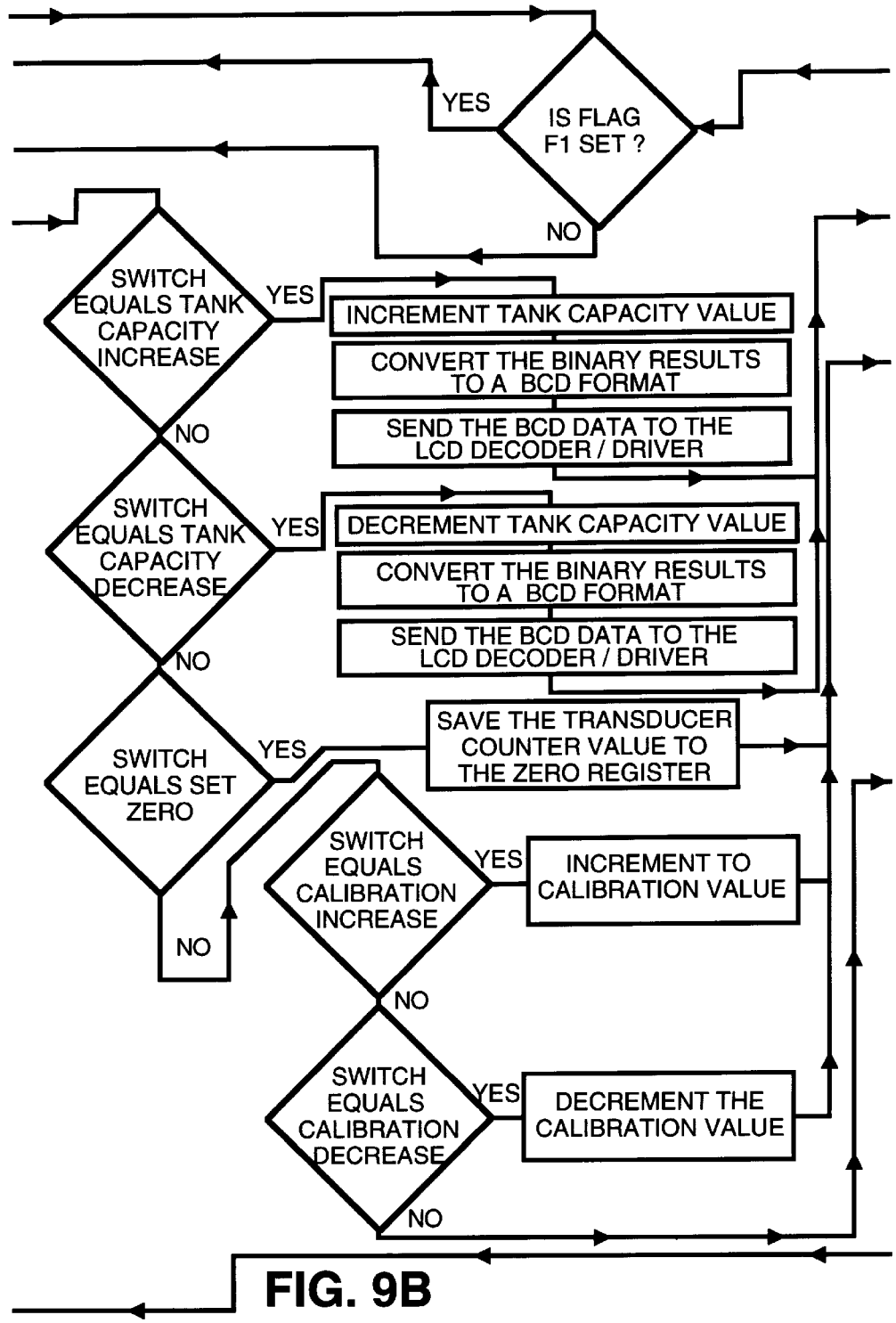
Figure 9C:
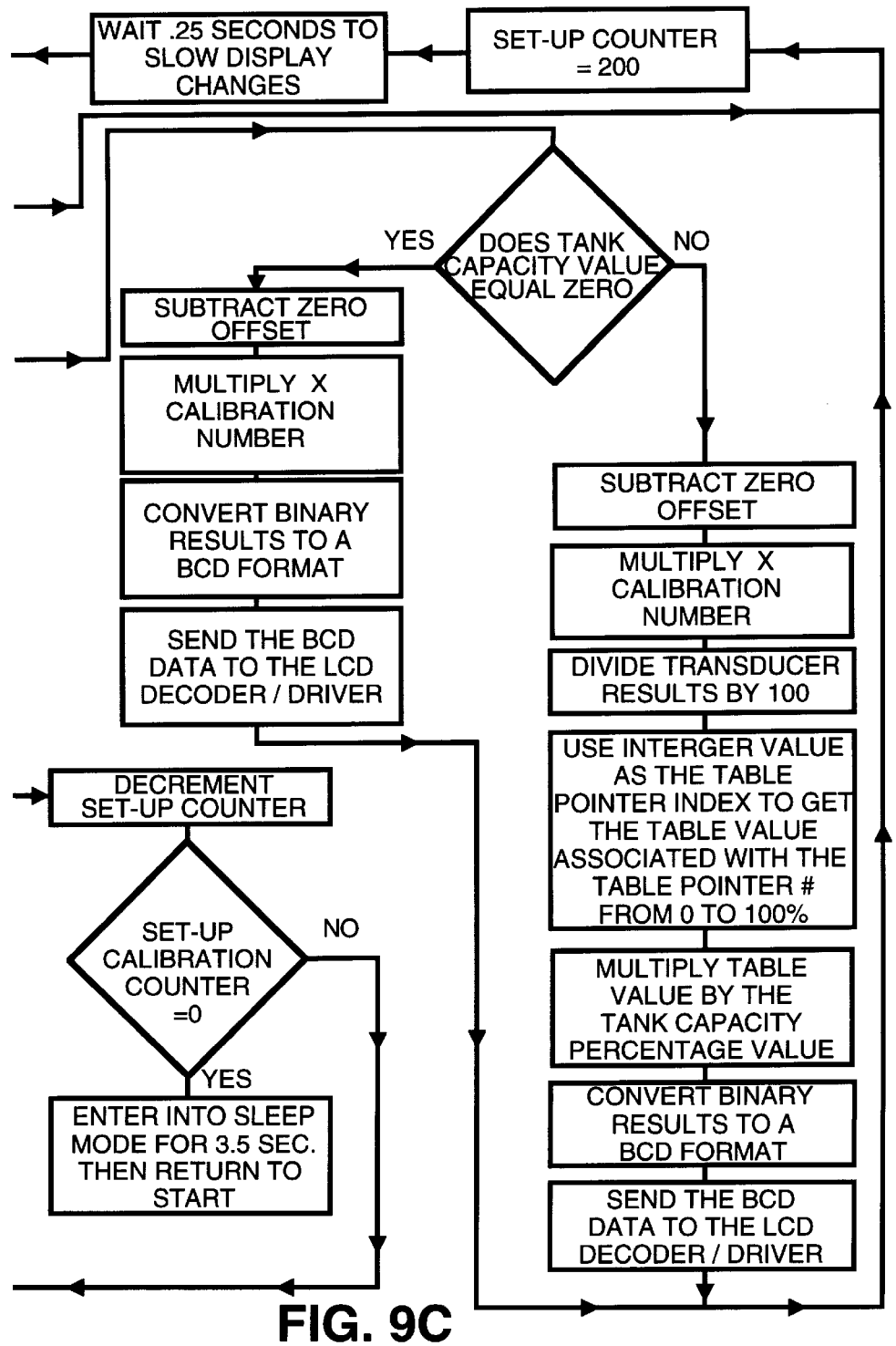
Figure 11A:
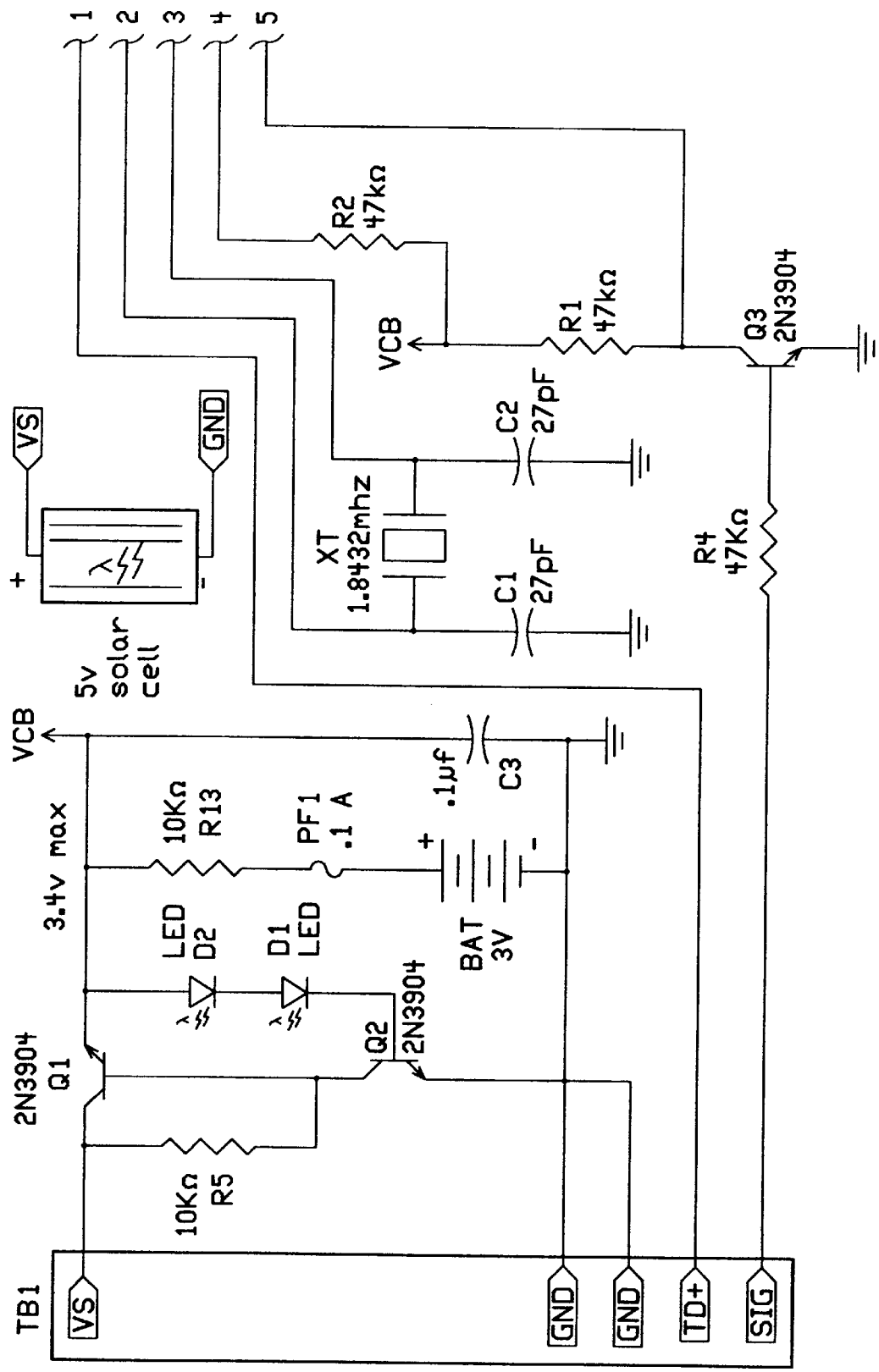
FIGS. 11A through 11D are a schematic of another embodiment of the device.
Figure 11B:
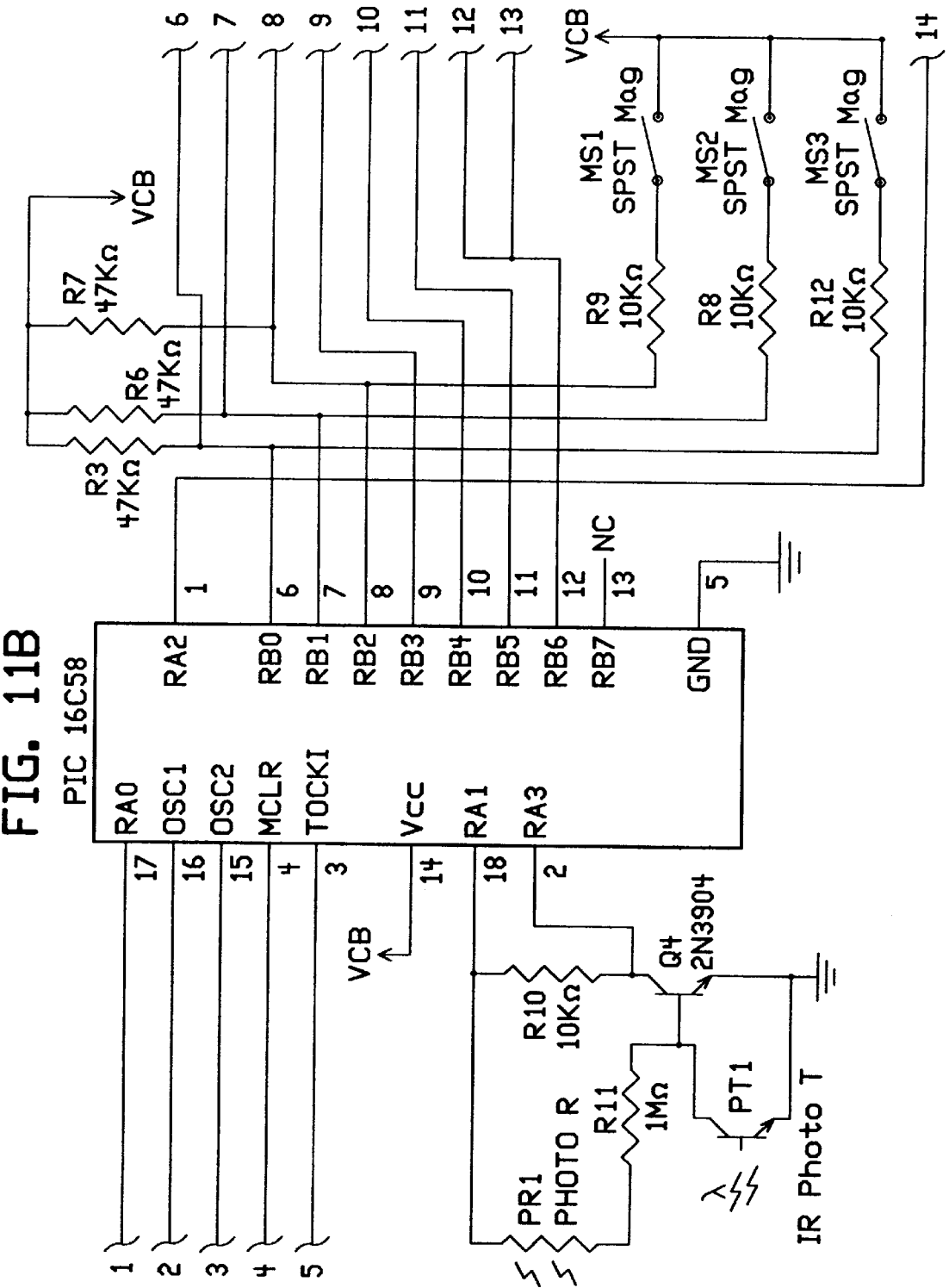
Figure 11C:
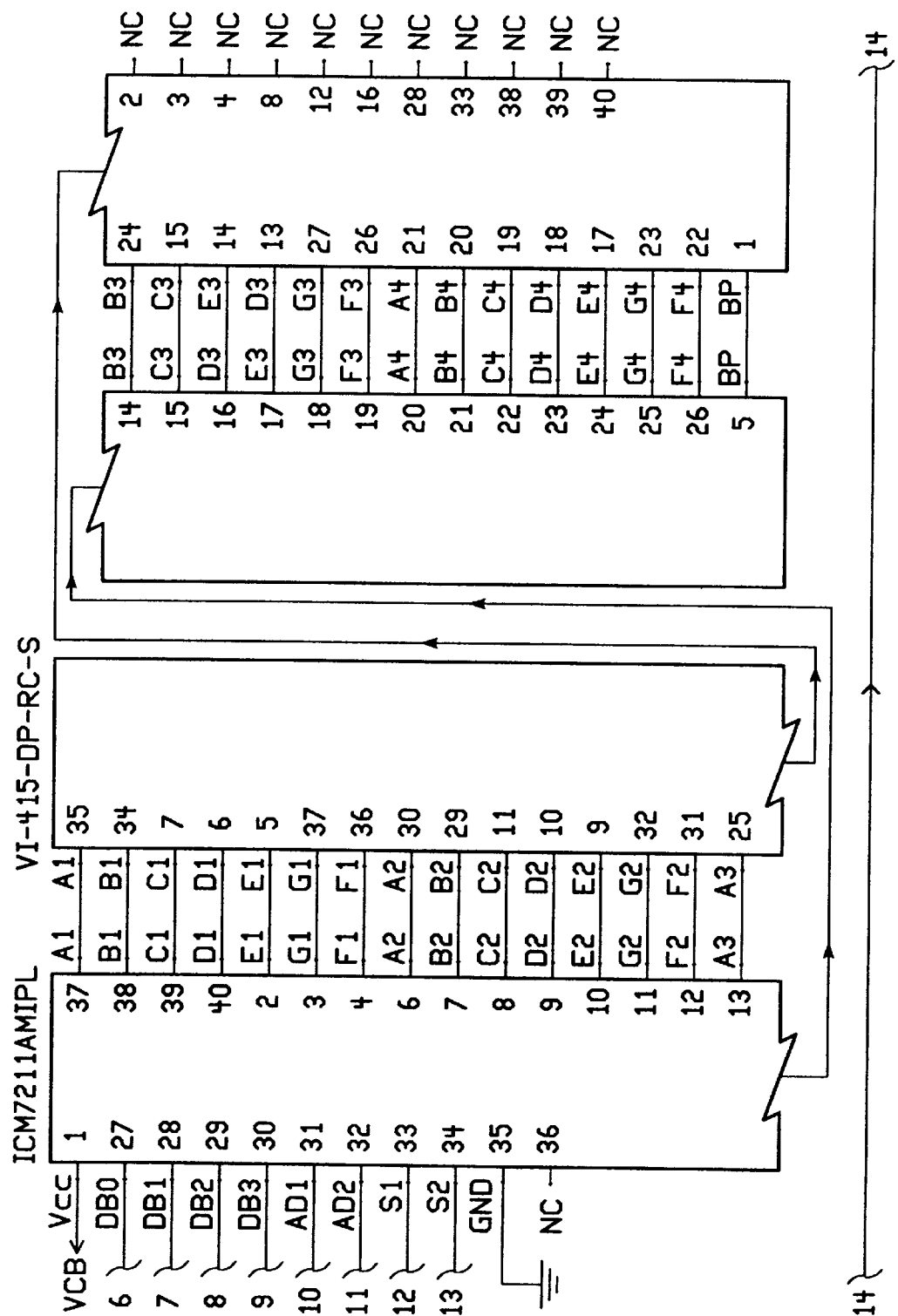
Figure 11D:
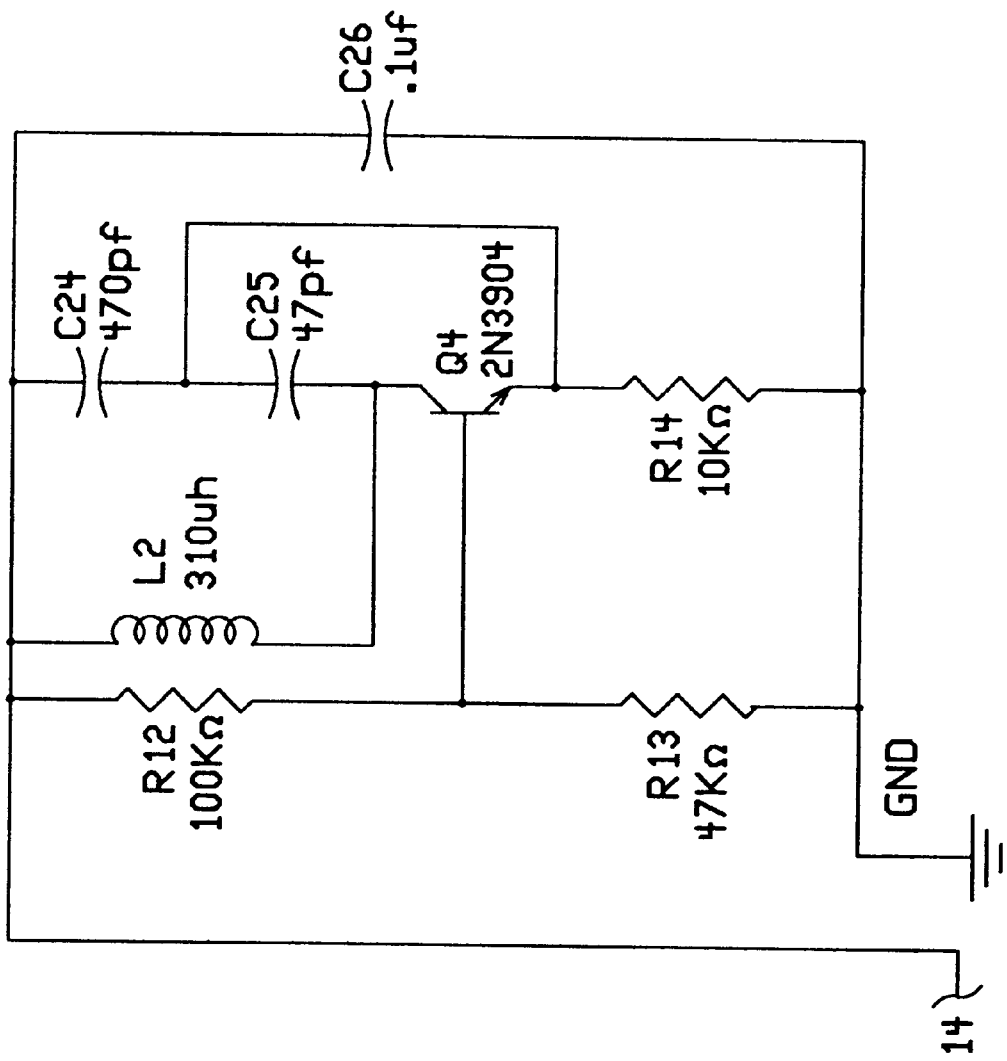
Figure 12:
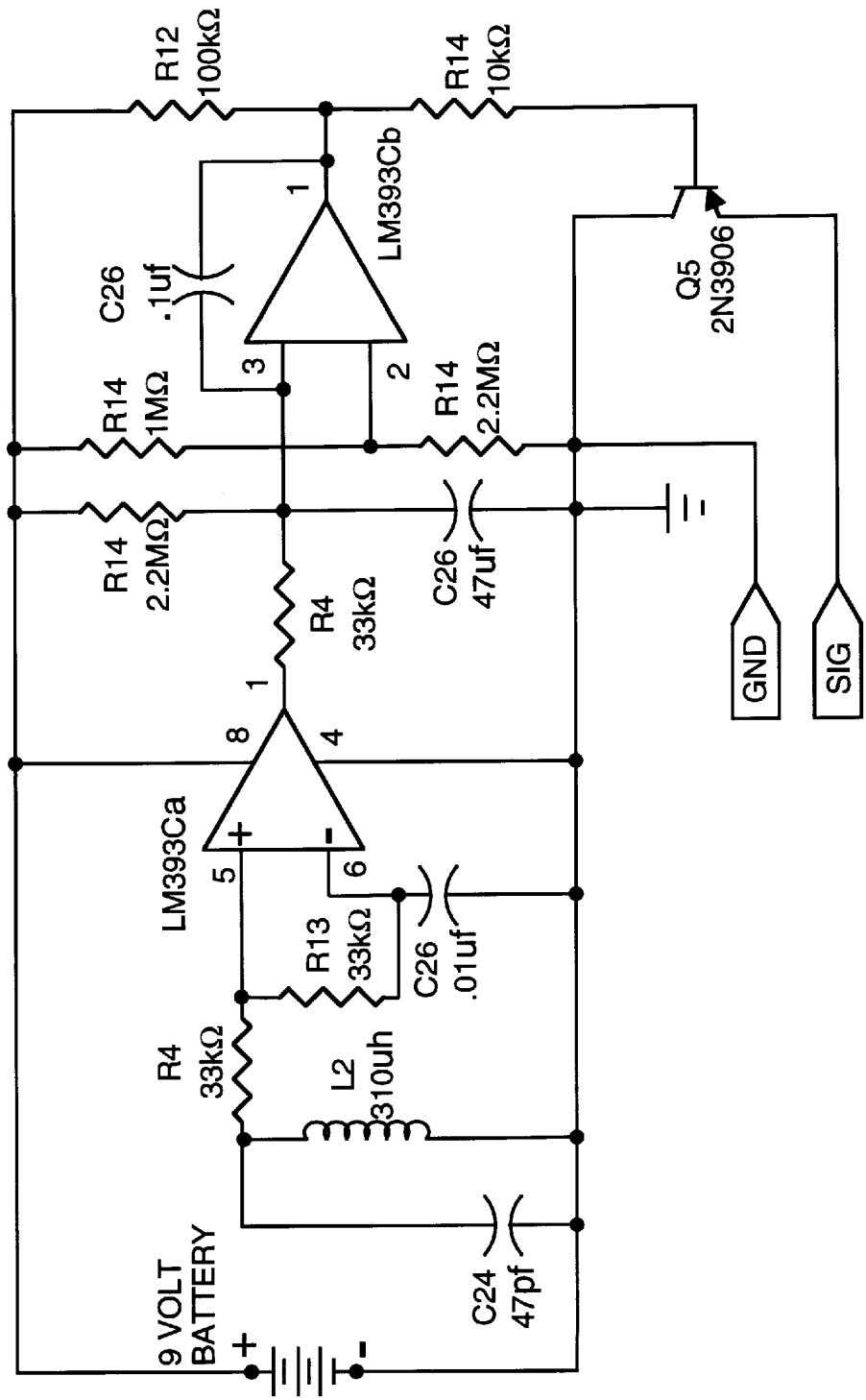
FIG. 12 is a schematic of a receiver device.
Figure 13A:
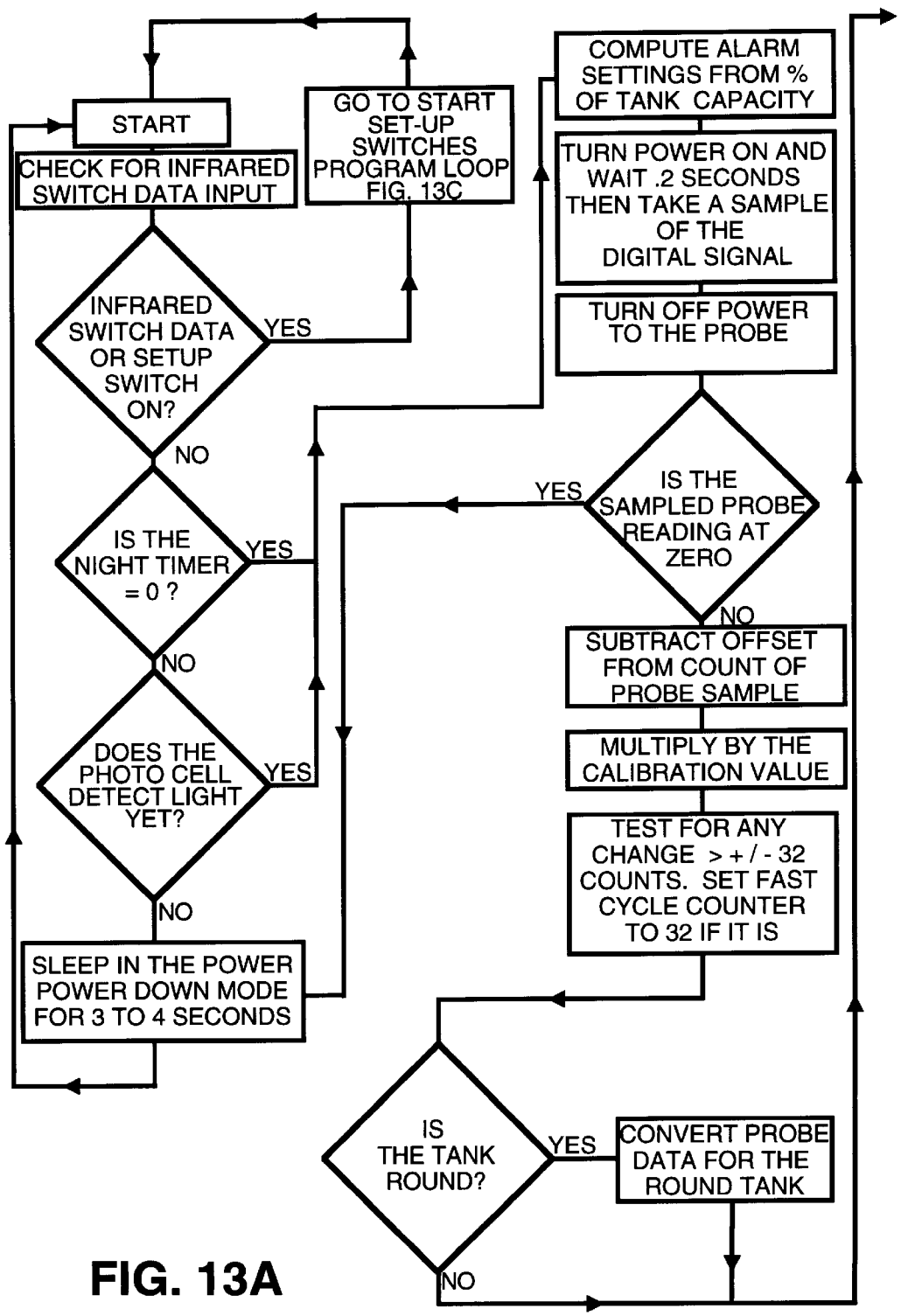
FIGS. 13A through 13D are a block flow diagram of another embodiment of the device.
Figure 13B:
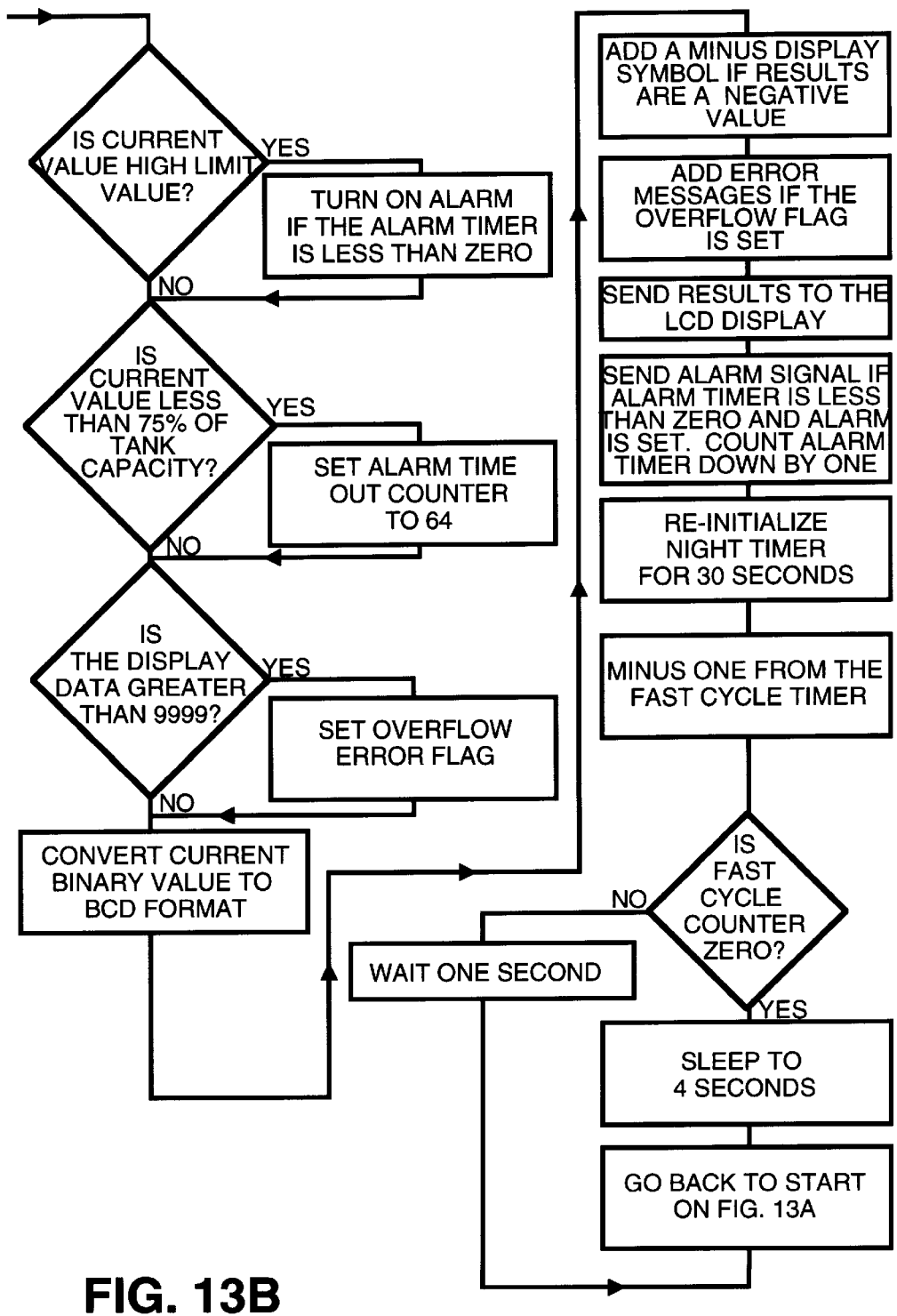
Figure 13C:
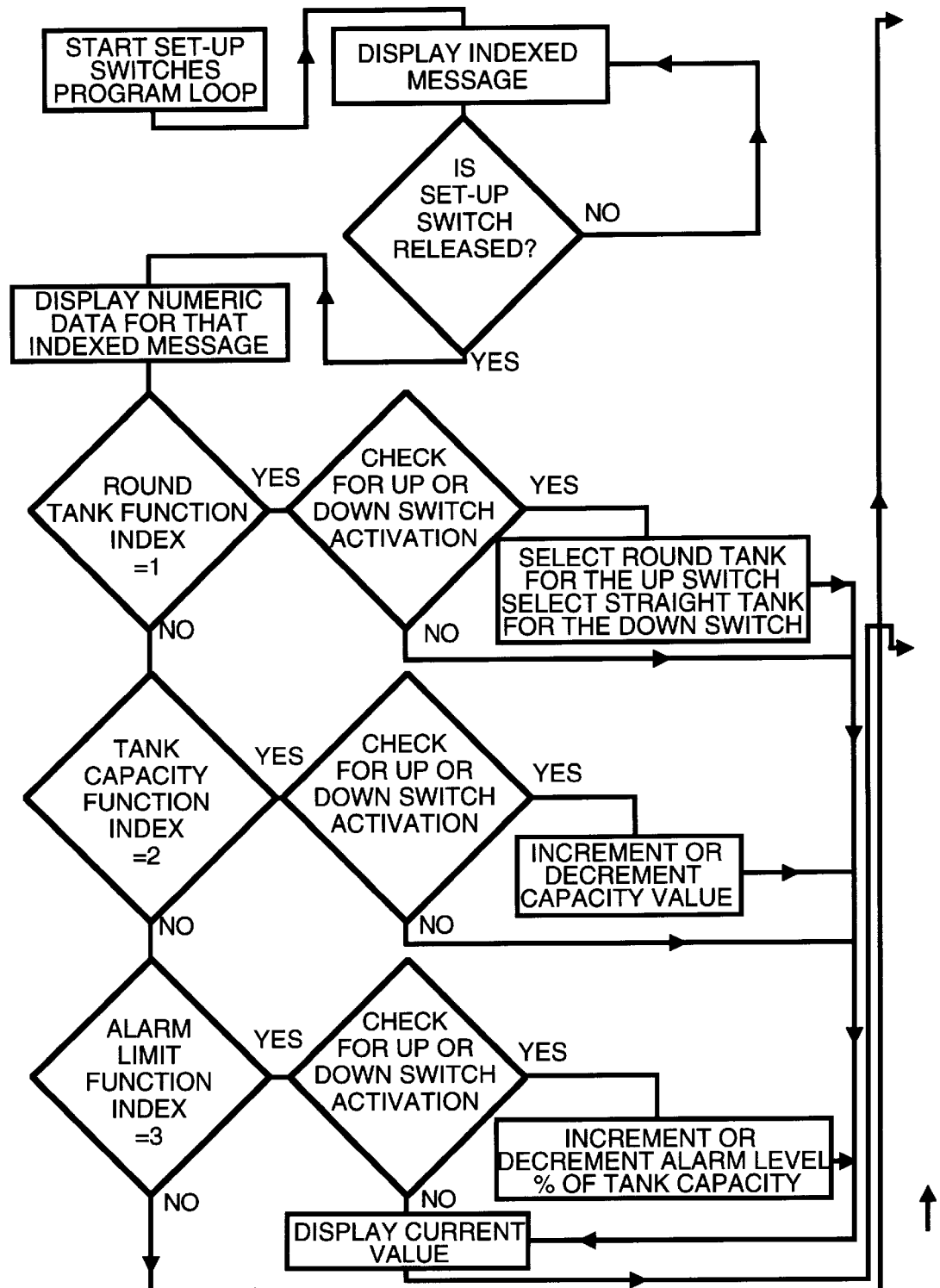
Figure 13D:
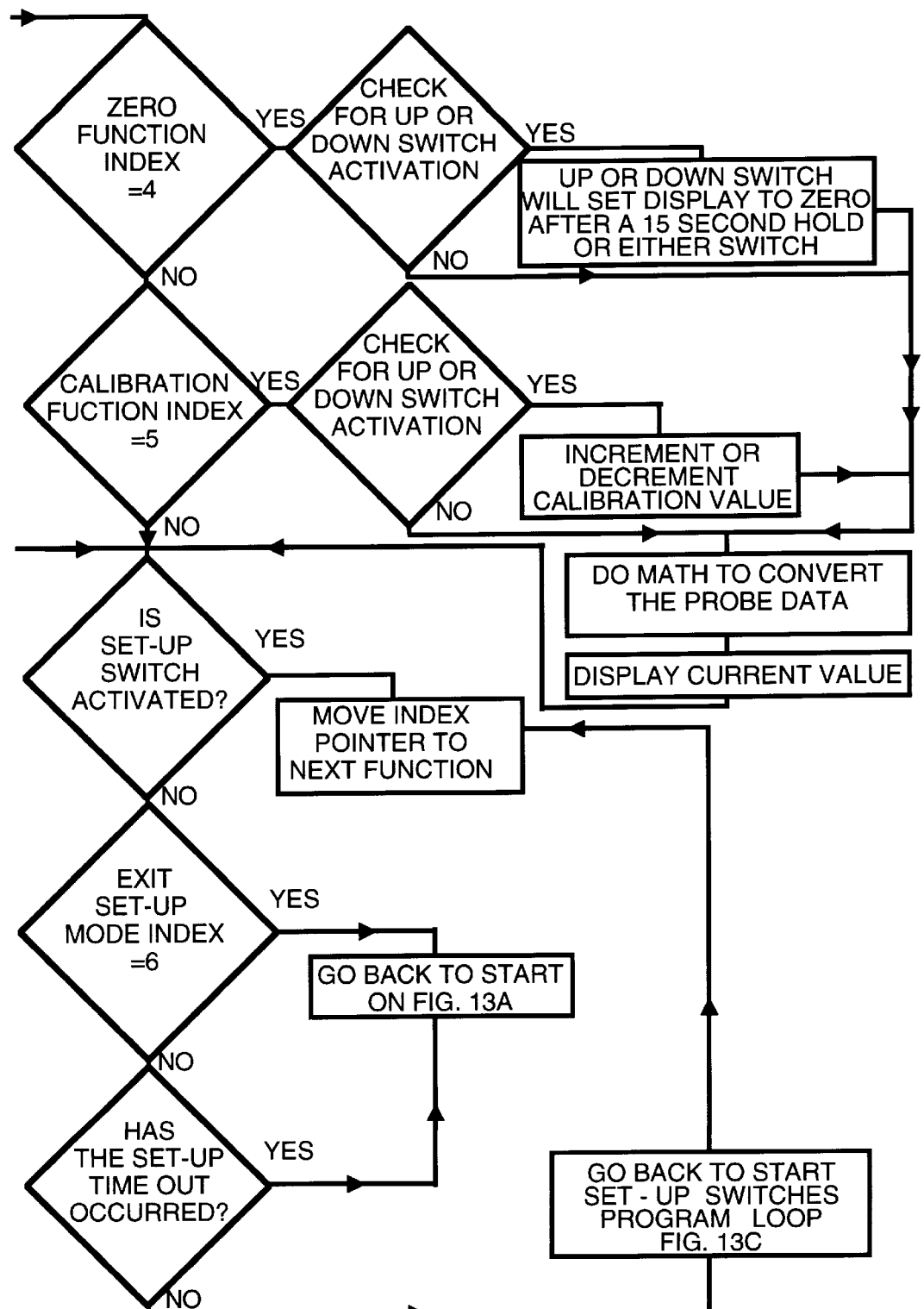

FIG. 7 is a block flow diagram is illustrating the overall relationship and connections of the major circuit components of the apparatus. The transducer assembly receives its power directly from the microprocessor and in turn transmits a digital signal of a particular frequency, as previously described, back to the microprocessor. A low power CMOS microprocessor such as a PIC16C54 by Microchip Inc., is desirable to allow operation from a three volt battery, and maintain its memory and settings during a power down sleep mode. This processor is responsible for all control and power management of the apparatus. A CDS photocell is provided to further reduce power consumption by monitoring the ambient light. In other embodiments, other types of light sensors and light sensor circuits can be utilized to monitor the ambient light and stay within the scope of this invention. If there is insufficient light to read the display then the photocell will signal the microprocessor to not power up the transducer or try to take any new readings. The display however will continue to show the last reading taken even though there may not be enough light to see it. The current embodiment of the apparatus uses, but is not limited to, three magnetically activated switches as one way to access the microprocessor to change program values. Other combinations and types of switches may be used. The status of these switches are monitored by the microprocessor and appropriate action is taken at the end of each transducer sampling and display cycle as detailed later on. An infrared data detector is also monitored by the microprocessor and may or may not be used in conjunction with the magnetic switches to adjust user programmable values. Higher level programming may be performed using a hand held multi-function infrared transmitter, such as Radio Shack model number 15-1918. Aiming the transmitter at the infrared data detector, and accessing the desired functions will allow access to programming as described later on. After the microprocessor has converted the digital signal from the transducer into a numerical value it then sends it directly to a low power LCD decoder/driver IC, such as an ICM7211AMIPL by Intersil Inc., to drive the LCD display. This LCD decoder/driver IC will then hold the last numerical value sent and continue having the LCD display, display the numerical value without any further assistance from the microprocessor until the next numerical value is then sent. An LCD display, such as VI-415-DP-RC-S by Varitronix Limited, was chosen for the low power consumption, wide temperature range and physical size. In an other embodiment however, displays of a different size, custom designed characters, back lighting, or other temperature ranges could be used and stay within the scope of this invention. In the illustrated embodiment the entire apparatus is powered by a solar cell such as a BP-378234 CU Sunceram II Solar Cell by Panasonic, capable of producing at least 4.0 volts at 20 milliamps in normal day light. Other types of solar cells or combinations of solar cells may be used within the scope of the invention. The output of the solar cell is presented to an ultra low power voltage regulator circuit as schematically illustrated in FIGS. 5A, 5B and 5C, which produces a typical output of 3.3 volts in average day light conditions. The output of this regulator is connected to a rechargeable lithium battery, such as a TLR7103 by Tadiran Electronic Industries, Inc., and to the power supply of the microprocessor and the associated electrical components. This allows the regulator to charge the battery whenever excess power is available. The regulator is also designed to prevent the discharge of the battery back through the regulator when the solar cell is not active. The battery is connected in the power circuit to the microprocessor to maintain power at all times to retain the calibration values stored there and operate the apparatus during low light conditions such as late evening when the solar cell can not produce as much power as the circuit is consuming.

Also now referring to FIGS. 4, 5, and 7 through 9, which further detail the electronics as well as block flow diagrams of one possible program for the apparatus, the microprocessor program is responsible for the power management of the transducer and itself, providing power for, and reading, the digital signal that is returned from the transducer, performing all math functions necessary to convert the transducer digital signal to a useable form, presenting that information to the LCD display driver, monitoring switches and other input devices, and storing and retaining all calibration settings in the microprocessor's information registers. The process begins with the microprocessor coming out of its' sleep mode and setting the appropriate registers in preparation for a new reading of the transducer. The photo cell is checked at this time to determine if there is sufficient light to allow the processor to continue the cycle of reading the transducer. If there is insufficient light, the photo cell will signal the processor to return to the sleep mode and remain in its lowest power consumption condition. This allows a new apparatus to be stored in a box, such as, in a sealed light proof shipping box, for years and will be fully functional when it is opened. If there is sufficient light the program will then turn on the power source to the transducer. After a short delay of about 0.05 seconds, to allow the transducer to stabilize, the digital signal coming from the transducer is tested to see if it is present. If it is not, the microprocessor is put back to sleep to conserve power. If a transducer signal is present, then the microprocessor begins the conversion process of the program. The sixty to sixty-five Hertz digital signal from the transducer is further divided by sixteen by an internal counter to produce a single pulse which has a period of about 0.24 to 0.26 seconds. The length of this period is directly related to the frequency of the digital signal from the transducer which is, as described earlier, directly proportional to the position of rod 10 and displacer 12. The microprocessor will begin to increment an input counter (IP counter) at the rising edge of the digital signal from bit three of the internal counter and will stop incrementing the IP counter at the falling edge of bit three of this counter. The total sample time is therefore one half the period of bit three of the internal counter or 0.12 to 0.13 seconds. During this time the microprocessor will increment the counter at a rate of one count every six micro seconds which is based on the microprocessors crystal controlled clock. At the end of this time the processor will stop incrementing the IP counter and will proceed to the next step of converting this count to a usable value. A previously set and stored "zero" offset value is now subtracted from the IP counter to remove all excess counts that it has accumulated. At this time the IP counter is multiplied by the calibration value that has been previously set.

At this point in the program the microprocessor will look for a Tank Capacity value other than zero. If it is zero, the results from the transducer as previously described will now ready to be converted into a binary coded decimal "BCD" value that can now be sent through and output port to the LCD decoder/driver IC. If the Tank Capacity value is any number other than zero, the results of the transducer will be used to reference access a lookup table for which values have been previously stored that describe a non-linear tank shape. The value found in the lookup table is then multiplied by the Tank Capacity value. This number is a binary value similar to the value returned from the transducer, but has now been adjusted to more closely represent the shape of a non-linear tank. This binary value is now ready to be converted into a binary coded decimal "BCD" value that can now be sent through and output to the LCD decoder/driver IC. In another embodiment, different program options or other combinations of math and lookup tables can be used to further enhance the usability of the apparatus. The following example illustrates one way this works:

Assuming the user has set the "zero" reference for the apparatus, and has established a calibration value that processes the desired units of measure, the microprocessor will clear the IP counter and increment that counter during the time determined by the transducer as described above. At this point the IP counter might contain a count of 20,550. If a previously stored offset count of 20,095 is subtracted from the IP counter the result in the IP counter of 455. If the calibration value was set for gallons and equals 1.3, then it is multiplied by the IP counter value to produce a result of 591.5 gallons. If a tank calibration value had been set, such as 2000, and a lookup a table has been created for a horizontally cylindrical round tank, i.e. a tank in which the volumetric rate of change is not linear as a function of the liquid level, such as is illustrated in FIG. 1, the previous value of 591.5 would be divided by 100 to bring it within range of the table index. The result of this is 5.915. Because this is not an exact match to any number of the Table Pointer values it is rounded to the closest value, which in this case would be six. The value stored at the Table Value referenced by the number six is 0.0842. This number is then multiplied by the Tank Capacity value of 2000 which produces a result of 168.5 gallons. A more accurate way to resolve numbers that do not match the table is to interpolate between the two closest table values of the Table Pointer column and calculate a multiplier value from them.

The calibration values can be easily set by the user to produce a display of any units the user may desire to use, i.e. gallons, liters, pounds, inches, percent of full, etc. In other embodiments of this apparatus the microprocessor program may require additional steps of math computations to be done at this point in the computations to deal with other applications or non-linear tank shapes and sizes.

After the information has been sent to the LCD display, the microprocessor then tests the magnetically activated switches to determine if any are active. If they are not, the microprocessor then looks at the IR data detector to determine if any signals are present from it. If not the microprocessor will now go to into a sleep mode for approximately three seconds, to reduce power consumption, after which it will wake up and start the program cycle all over again. If one of the switch inputs or the IR data detector has been found to be active, the microprocessor will go into a setup calibration mode and will remain in that mode until no other inputs are detected. Upon entering this mode, a delay of at least five seconds is required to validate the input function before continuing the setup and calibration process. If this validation process fails the microprocessor will be returned to the sleep mode. If the validation is successful the microprocessor will carry out the desired function. A "zero" function will result in the current value in the IP counter to be stored into the zero calibration register. This is required to establish the point that the user wishes to define as an empty tank. After setting the "zero" value, the user is now expected to fill the tank with a know quantity of liquid. The calibration values when activated by the appropriate switches will initiate an increment or decrement procedure of the program that aids the user in arriving at the desired reading to represent the quantity stored in the tank. This process will continue until no further inputs are detected, whereupon the microprocessor will return to the sleep mode. The IR data detector operates in a similar fashion except that digital data is transferred to the microprocessor which allows for much greater program flexibility in setting up complicated calibration values, i.e., entering various offsets for tarring or netting values, or entering multiple values into program formulas dealing with non-linear tank shapes. As with the switches if no user activity is detected from the IR data detector, the program will return the microprocessor to the sleep mode.

The sleep mode is a microprocessor function that turns off all electrical activity but keeps the device powered to retain all settings and calibration values. A built in watch dog timer inside the microprocessor will restart the microprocessor every 3.5 to 4.0 seconds and begin program execution from the start.

Referring also now to FIGS. 10, 11, 12, and 13 a gauge is shown which incorporates provisions for a both straight wall tank and a horizontally cylindrical tank, with a percentage full alarm output. Utilizing a more capable microprocessor such as a PIC16C58 by Microchip Inc. and combining it with a transmitter. This would be used in conjunction with a remote receiver circuit mounted to an alarm annunciator, such as a battery powered high level alarm model 200401-1 by Meco, Inc. This example provides the user of the gauge to program specifically for the straight walled or a round walled tank and to allow the user to set a high level alarm value that will signal the user when the tank level has exceeded that level.

The program begins by waking up from a sleep mode and checking for any data inputs from the setup switch or the IR detector. If none is found then the program will check the night timer value to see if it is zero, if it has not reached zero and there is not sufficient light then no readings are taken and the processor will go back to sleep. If the night timer has reached zero which will occur once every thirty seconds, or there is sufficient light present, the computer will proceed on with the program. The purpose of the night timer is to force the gauge to take new readings, but at a much slower rate when there is no light. It also allows the gauge to detect any sudden changes at night such as when the user fills the tank. The next step in the program is to compute the alarm setting. This is accomplished by multiplying the tank capacity by the percent of full that the user wishes the high level alarm to be set to. This number is stored for later use. The power to the probe is now turned on and, after a short wait of two-tenths of a second, the program will take a reading of the frequency of the digital signal that is coming back from the probe. This frequency is directly proportional to the position of the probe float assembly, and can be converted by a counter in the computer into a number. After this the probe power will shut off to conserve battery life.

An offset zero value which was previously set up during calibration is then subtracted from the probe count value. The result is a value that represents the change in frequency from a calibrated zero point. To make this value useful it is them multiplied by a calibration value that was also setup previously. The calibration value can be adjusted to read out in any units that the user desires. At this point a test is done to determine if the probe readings have changed significantly from the previously measured value. If they have changed by more than thirty-two counts the program will set a fast cycle flag which will allow one reading each second instead of the normal three to four seconds so that the gauge will be more responsive during fast filling of the tank. This will continue until the fast cycle timer counts down to zero, about thirty seconds, and no more changes are occurring with the probe.

At this point a decision is made in the program as to the type of tank that the user has selected. If the user has selected a straight wall tank which results in a linear change of volume for each vertical inch of change, then no further math is needed and the program will display the current value calculated earlier. If the user has selected a round tank, the program will then need to do some additional work to convert the linear measurement that it currently has, to a volume measurement that represents the shape of the round tank. To minimize calculations, a look-up table was created that describes the shape of the tank. Since the tank is round, only half of the table was needed since the other half is just a mirror image it. To linearize the table to the probe data, fifty table points were needed to convert into one-hundred effective table values which corresponds to a value of zero to 100% of the tanks capacity. To use this table the calibration value is adjusted to produce a count from zero to 5000. This count is divided by fifty to produce a integer number from zero to one-hundred, and a remainder which will be used later. Using the integer value as the index, a table a value can be found that corresponds to a percent of full that the tank is. The remainder left from the previous division is now used to calculate a linear interpolation between the table values to improve the resolution of the table. This is simply a matter of reading the next table value, subtracting the previous value from it to find the change, and multiplying the results by the remainder by two. The result is then added to the current table value and then multiplied by the tank capacity value to produce the final output for display to the user.

The next step in the program is to test to see if the current measured value exceeds a value that was calculated and set up for the high level alarm. The value for the alarm was entered in the setup mode as a percent of the tank capacity and is limited from 85% to 100%. If the current value exceeds the alarm setting and if the alarm timer is greater than zero then the program tells the microprocessor to activate the alarm transmitter on pin one. The purpose of the alarm timer is to maintain the signal for about five minutes and then shut it off to conserve battery power. The alarm shut off counter is reset for activation only after the liquid in the tank falls below 75% of capacity. This is necessary before the alarm will operate again. At this point, the program will do a series of tests to determine if any over flow errors have occurred. If the gauge reading is greater than 9999 then an over flow error flag will be set. After the probe data has been converted from a binary value to a BCD format the data is adjusted to show a minus sign in the most significant digit if the results are negative. If an over flow condition has occurred it will show an "H" in the most significant digit for a straight walled tank, or it will display "EEEE" if a round tank has been selected. In both cases, it indicates an over range condition and the user should adjust the calibration settings to correct this situation. The results are now ready to be sent to the display for the user to see.

The program will now perform a number of housekeeping chores. First, it will send an alarm signal out if the alarm timer is greater than zero and the alarm flag is set. If the alarm timer is not zero it will be counted down by one. Next the night timer will be re-initialized and the fast timer counted down by one if it is not zero. If the fast cycle timer is at zero then the program will go into a normal sleep mode for three to four seconds and then a watchdog timer will re-start from the beginning. If the fast cycle timer is not at zero then the program will pause for about zero second and then re-start.

The program is also designed to provide the user with a menu of setup features that are needed to properly setup and calibrate the gauge. This setup mode, as it is sometimes called, may be entered by an infrared transmitter or by placing a magnet near the top switch on the front of the gauge and holding it there for about five seconds. This will cause the program to display a message indicating the type of information it is about to display. Upon removing the magnet, the actual data will now be shown and the program will wait for the user to make any adjustments to the displayed value. Re-selecting the setup switch will advance the program to the next setup function and then the value for that function. The first message that is displayed allows the user to select the type of tank that is needed, i.e. straight or round wall or special tank shapes. After the tank selection is made, the tank capacity is entered in next. This is followed by the high level alarm setting which is set as a percentage of tank capacity. The "zero" function is next and zero's the display's reading of the gauge to represent an empty condition in the tank. The last function in the list is the calibration function which sets the display to read the actual quantity in the tank. In the actual implementation of the gauge the zero function must be done before the calibration function is performed. Each of the settings can be adjusted by the up or down switches that are also magnetically activated from the front of the gauge, or by an infrared transmitter. The last message in the setup mode tells the operator that the gauge will return to normal operation.

The program will wait in the setup mode for a period of about thirty seconds constantly checking for user input and then if no user inputs have occurred it will timeout and reset itself back to the beginning of the start of the program. The program will simply use whatever values were last entered in the setup process.

While there is shown and described certain embodiments of the invention, it is to be distinctly understood that this invention is not limited thereto but may be variously embodied to practice within the scope of the following claims.

We claim:

1. An apparatus for measuring the quantity of liquid in a liquid reservoir which comprises:
    a displacer member at least partially positionable within the liquid and suspended from a metallic rod fixed above the liquid, the displacer member having a negative buoyancy such that vertical movement of the displacer due to variable liquid levels is limited to a pre-determined range;
    a single inductor coil positioned about a top end of the metallic rod sized to slidably receive the top end of the metallic rod throughout the pre-determined range;
    an oscillator circuit including the inductor coil configured to produce a particular frequency output signal dependent upon a length of the rod received by the coil;
    a signal processing circuit configured to convert the frequency of the output signal to a display signal representative of a displacement of the rod within the coil;
    a display in communication with the signal processing circuit to display the display signal; and
    a solar power supply configured to supply power to the inductor, oscillator circuit, the signal processing circuit and the display.

2. An apparatus for measuring the quantity of liquid in a liquid reservoir which comprises:
    a displacer member at least partially positionable within the liquid and suspended from a metallic rod fixed above the liquid, the displacer member having a negative buoyancy such that vertical movement of the displacer due to variable liquid levels is limited to a ore-determined range;
    a single inductor coil positioned about a top end of the metallic rod sized to slidably receive the top end of the metallic rod throughout the pre-determined range;
    an oscillator circuit including the inductor coil configured to produce a particular frequency output signal dependent upon a length of the rod received by the coil;
    a signal processing circuit configured to convert the frequency of the output signal to a display signal representative of a displacement of the rod within the coil; and
    a display in communication with the signal processing circuit to display the display signal.

* * * * *